US011087363B2

(12) United States Patent
Golder

(10) Patent No.: US 11,087,363 B2
(45) Date of Patent: *Aug. 10, 2021

(54) APPARATUS AND METHOD FOR PROCESSING USER PERSONAL INFORMATION

(71) Applicant: Peter Newman Golder, Hanover, NH (US)

(72) Inventor: Peter Newman Golder, Hanover, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/840,432

(22) Filed: Apr. 5, 2020

(65) Prior Publication Data

US 2020/0234340 A1   Jul. 23, 2020

Related U.S. Application Data

(63) Continuation of application No. 15/463,055, filed on Mar. 20, 2017, now Pat. No. 10,636,059.

(51) Int. Cl.
*G06Q 30/00* (2012.01)
*G06Q 30/02* (2012.01)
*G06Q 10/10* (2012.01)

(52) U.S. Cl.
CPC ....... *G06Q 30/0269* (2013.01); *G06Q 10/107* (2013.01); *G06Q 30/02* (2013.01); *G06Q 30/0273* (2013.01); *G06Q 30/0277* (2013.01); *G06Q 30/0217* (2013.01); *G06Q 30/0241* (2013.01); *G06Q 30/0251* (2013.01)

(58) Field of Classification Search
None
See application file for complete search history.

(56) References Cited

U.S. PATENT DOCUMENTS

| 7,660,737 B1* | 2/2010 | Lim | G06Q 30/0269 705/14.49 |
| 8,527,337 B1* | 9/2013 | Lim | G06F 16/903 705/14.35 |
| 2004/0186774 A1* | 9/2004 | Lee | G06Q 30/0209 705/14.11 |

OTHER PUBLICATIONS

Grossklags et al. published article "When 25 Cents is too much: An Experiment on Willingness-To-Sell and Willingness-To-Protect Personal Information", Jun. 7, 2007, WEIS—academia.edu (Year: 2007).*

* cited by examiner

*Primary Examiner* — Naresh Vig

(57) ABSTRACT

In an embodiment, a system server receives, from a plurality of advertiser devices, a plurality of advertisements, at least one corresponding personal information value, and a corresponding price. The system server calculates, for each of a plurality of personal information types, a corresponding price. The system server sends, to a first message account, a plurality of messages, in which each message includes a respective advertisement of the subset of advertisements. Then the system server instructs a message device to output an indication of, for each of a plurality of types of personal information, whether a corresponding personal information value has been released.

20 Claims, 3 Drawing Sheets

APPARATUS AND METHOD FOR PROCESSING USER PERSONAL INFORMATION

This application is a continuation of U.S. patent application Ser. No. 15/463,055, filed Mar. 20, 2017, the content of which is incorporated by reference herein in its entirety.

DETAILED DESCRIPTION

Figure 1:
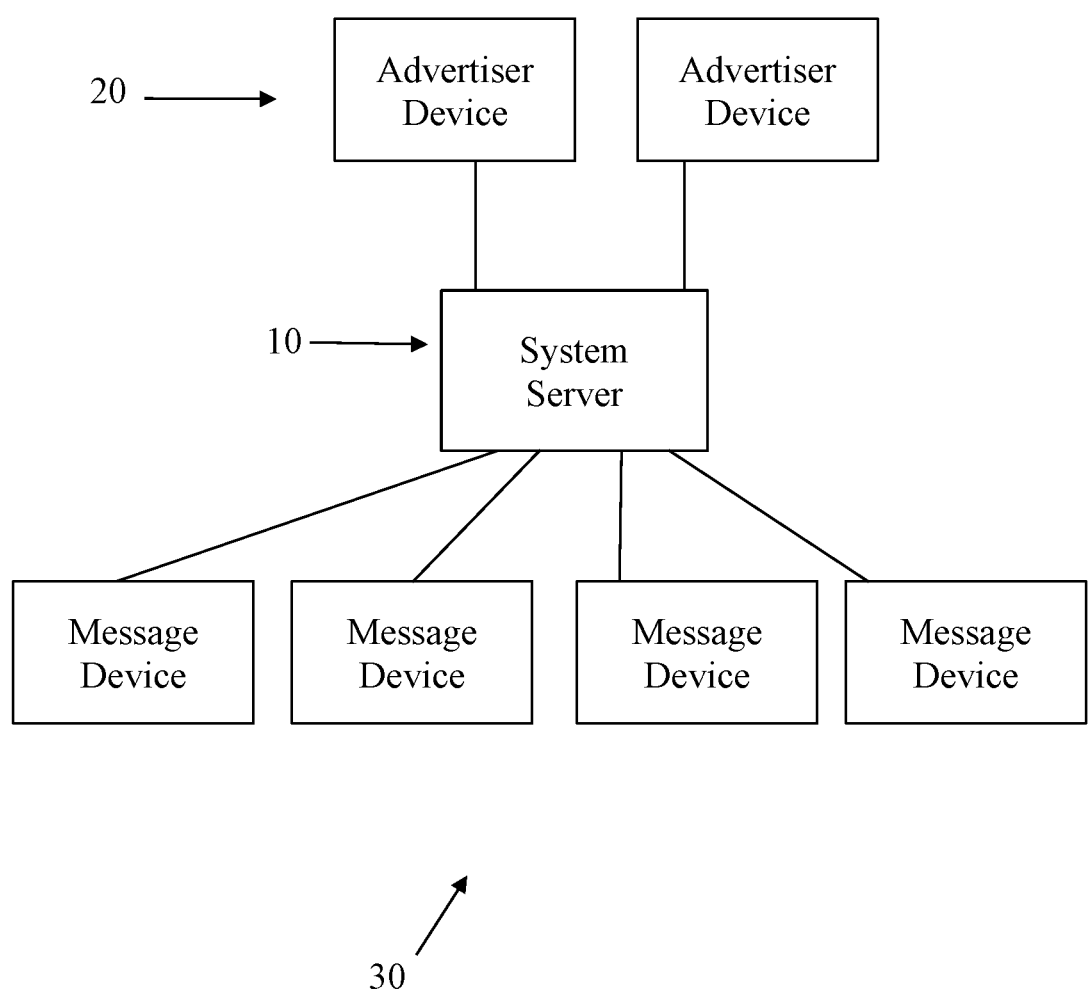
FIG. 1 depicts an embodiment of the invention in which a system server communicates with advertiser devices and message devices.

The following sections I-X provide a guide to interpreting the present application.

1. Terms

The term "product" means a machine, manufacture and/or composition of matter, unless expressly specified otherwise.

The term "process" means a process, algorithm, method or the like, unless expressly specified otherwise.

Each process (whether called a method, algorithm or otherwise) inherently includes one or more steps, and therefore all references to a "step" or "steps" of a process have an inherent antecedent basis in the mere description of a process, or in the mere recitation of the term 'process' or a like term. Accordingly, any reference in a claim to a 'step' or 'steps' of a process has sufficient antecedent basis.

The term "invention" and the like mean "the one or more inventions disclosed in this application", unless expressly specified otherwise.

The terms "an embodiment", "embodiment", "embodiments", "the embodiment", "the embodiments", "one or more embodiments", "some embodiments", "certain embodiments", "one embodiment", "another embodiment" and the like mean "one or more (but not all) embodiments of the invention", unless expressly specified otherwise. Two or more described embodiments may or may not be mutually exclusive. The mere fact that two embodiments are described, or that two embodiments are described in proximity to each other or in conjunction with each other, does not imply that the two embodiments are mutually exclusive. A described embodiment may or may not be strictly narrower than and encompassed by another described embodiment. The mere fact that two embodiments are described, or that two embodiments are described in proximity to each other or in conjunction with each other, does not imply that one of the embodiments is strictly narrower than and encompassed by the other embodiment.

The term "variation" of an invention means an embodiment of the invention, unless expressly specified otherwise.

A reference to "another embodiment" in describing an embodiment does not imply that the referenced embodiment is mutually exclusive with another embodiment (e.g., an embodiment described before the referenced embodiment), unless expressly specified otherwise. Similarly, the mere fact that two (or more) embodiments are referenced does not imply that those embodiments are mutually exclusive.

One embodiment of the invention may cover or embrace more than one other embodiment of the invention. For example, a first embodiment comprising elements a, b, and c may cover a second embodiment that comprises elements a, b, c, and d as well as a third embodiment covering elements a, b, c, and e. Similarly, each of the first, second, and third embodiments would cover a fourth embodiment comprising elements a, b, c, d, and e.

The terms "including", "comprising" and variations thereof mean "including but not necessarily limited to", unless expressly specified otherwise. Thus, for example, the sentence "the machine includes a red widget and a blue widget" means the machine includes the red widget and the blue widget, but may possibly include one or more other items as well as another example, the sentence "Examples of machines include a computer and a motor" means that one example of a machine is a computer, another example of a machine is a motor, and there may be other examples (e.g., things that are neither computers nor motors may nevertheless be a machine)

The term "consisting of" and variations thereof mean "including and also limited to", unless expressly specified otherwise. Thus, for example, the sentence "the machine consists of a red widget and a blue widget" means the machine includes the red widget and the blue widget, but does not include anything else.

The term "compose" and variations thereof mean "to make up the constituent parts of, component of or member of", unless expressly specified otherwise. Thus, for example, the sentence "the red widget and the blue widget compose a machine" means the machine includes the red widget and the blue widget.

The term "exclusively compose" and variations thereof mean "to make up exclusively the constituent parts of, to be the only components of, or to be the only members of", unless expressly specified otherwise. Thus, for example, the sentence "the red widget and the blue widget exclusively compose a machine" means the machine consists of the red widget and the blue widget (i.e. and nothing else).

The indefinite articles "a" and "an" and the definite article "the" refer to "one or more" of the noun modified by that article, unless expressly specified otherwise. Thus, for example, the phrase "a widget" means one or more widgets, unless expressly specified otherwise. Similarly, after reciting the phrase "a widget", a subsequent recitation of the phrase "the widget" means "the one or more widgets". Accordingly, it should be understood that the word "the" may also refer to a specific term having antecedent basis. For example, if a paragraph mentions "a specific single feature" and then refers to "the specific single feature," then the word "the" should be understood to refer to the previously mentioned "a specific single feature."

The term "plurality" means "two or more", unless expressly specified otherwise.

A "set" of things (e.g., a set of widgets) may include one or more of those things (e.g., one or more widgets), which are members of the set. Whether the set includes a particular item as a member is synonymous with whether a set includes the particular item.

A "subset" of things (e.g., a subset of widgets) may include one or more of those things. A subset does not imply that there must be in the subset fewer things than in some other set of things. A subset of a particular set may include some or all of the members of the set.

A reference to a "plurality" (and like terms such as "at least one", "one or more", "set" and the like) has inherent antecedent basis for the "number" of things included in the plurality (or in the set, etc.). For example, in the phrase "receiving a plurality of commands", there is inherent antecedent basis for "the number of commands" For example, in the phrase "receiving a set of commands", there is inherent antecedent basis for "the number of commands".

The term "herein" means "in the present application, including anything which may be incorporated by reference", unless expressly specified otherwise.

The phrase "at least one of" is equivalent to "one or more of", and when either such phrase modifies a plurality of things (such as an enumerated list of things), such phrase means any combination of one or more of those things, unless expressly specified otherwise. For example, the phrase "at least one of a widget, a car and a wheel" means either (i) a widget, (ii) a car, (iii) a wheel, (iv) a widget and a car, (v) a widget and a wheel, (vi) a car and a wheel, or (vii) a widget, a car and a wheel. The phrase "at least one of", when such phrase modifies a plurality of things does not mean "one of" each of the plurality of things. For example, the phrase "at least one of a widget, a car and a wheel" does not mean "one widget, one car and one wheel".

Numerical terms such as "one", "two", etc. when used as cardinal numbers to indicate quantity of something (e.g., one widget, two widgets), mean the quantity indicated by that numerical term, but do not mean at least the quantity indicated by that numerical term. For example, the phrase "one widget" does not mean "at least one widget", and therefore the phrase "one widget" does not cover, e.g., two widgets.

The phrase "based on" does not mean "based only on", unless expressly specified otherwise. In other words, the phrase "based on" covers both "based only on" and "based at least on". Therefore, the phrase "based on" is equivalent to the phrase "based at least on" and is also equivalent to the phrase "based at least in part on". For example, the phrase "element A is based on element B and element C" covers embodiments where element A is calculated as the product of B times C (in other words, A=B×C) and where A is calculated as the sum of B plus C (in other words, A=B+C).

The term "represent" and like terms are not exclusive, unless expressly specified otherwise. For example, the term "represents" does not mean "represents only", unless expressly specified otherwise. For example, the phrase "the data represents a credit card number" covers both "the data represents only a credit card number" and "the data represents a credit card number and the data also represents something else".

The term "whereby" is used herein only to precede a clause or other set of words that express only the intended result, objective or consequence of something that is explicitly recited before the term "whereby". Thus, when the term "whereby" is used in a claim, the clause or other words that the term "whereby" precedes do not establish specific further limitations of the claim or otherwise restrict the meaning or scope of the claim.

The terms "e.g.", "such as" and like terms mean "for example", and thus do not limit the term or phrase they explain. For example, in the sentence "the computer sends data (e.g., instructions, a data structure) over the Internet", the term "e.g." explains that "instructions" are an example of "data" that the computer may send over the Internet, and also explains that "a data structure" is an example of "data" that the computer may send over the Internet. However, both "instructions" and "a data structure" are merely examples of "data", and other things besides "instructions" and "a data structure" can be "data".

The term "time", when used as a determined quantity, means any sort of time (e.g., time of day, day of week, date, year) on which one or more things are determined to occur.

The term "period of time" means any sort of duration (e.g., number of seconds, number of minutes, other durations) of one or more things.

The term "good" generally refers to anything which may be provided in exchange for money or other value, and thus "good" includes services, rights and items, whether tangible or intangible.

The term "respective" and like terms mean "taken individually". Thus if two or more things have "respective" characteristics, then each such thing has its own characteristic, and these characteristics can be different from each other but need not be. For example, the phrase "each of two machines has a respective function" means that the first of the two machines has a function and the second of the two machines has a function as well. The function of the first machine may or may not be the same as the function of the second machine.

Similarly, in the phrase "for each of the plurality of widgets, determining a respective price of the widget, a reference to "the widget" in that phrase means the "determining" step is applied to (performed for) each widget of the plurality of widgets. The phrase "the respective prices of the plurality of widgets" thus means the set which includes as members each respective price of the plurality of widgets.

The term "i.e." and like terms mean "that is", and thus limits the term or phrase it explains. For example, in the sentence "the computer sends data (i.e., instructions) over the Internet", the term "i.e." explains that "instructions" are the "data" that the computer sends over the Internet.

A numerical range includes integers and non-integers within the range, unless expressly specified otherwise. For example, the range "1 to 10" includes the integers from 1 to 10 (e.g., 1, 2, 3, 4, . . . 9, 10) and non-integers (e.g., 1.1, 1.2, . . . 1.9). A range may be denoted as non-inclusive explicitly, such as "the range of voltages from 2.5 volts to 10.3 volts exclusive", and such a range excludes 2.5 volts and excludes 10.3 volts.

A range can be continuous or discrete. For example, the range "from three meters to five meters" is a continuous range. The range "integer ranges from three meters to five meters" is a discrete range.

A range includes two ends, and each such end is, where the range is inclusive, a thing that is included in the range. Thus a range inherently has antecedent basis for the term "the ends", and has antecedent basis for the term "an end" and has antecedent basis for the terms "the first end" and "the second end". Where the range is ordered or may be ordered (e.g., a range of integers that may be ordered numerically, a range of text that may be ordered alphabetically) the range includes ends that are distinguishable because of their respective ordering. Thus a range that may be ordered has antecedent basis for terms that denote the place of the end in the ordering scheme (e.g., a range that can be numerically ordered has a "low end" and a "high end").

When used to compare values (e.g., integers, fractions) which are capable of being ordered with respect to each other, the phrase "not greater than" is equivalent to "less than or equal to". Similarly, the phrase "not less than" is equivalent to "greater than or equal to".

In reference to a plurality of things (e.g., a plurality of widgets) superlatives, where a superlative may be applied to the plurality (e.g., the largest widget of the plurality of widgets, the lowest price of the set of prices) and there is inherently antecedent basis for such superlative.

For example, for a plurality of numbers, there is inherent antecedent basis for the phrase "the greatest number of the plurality of numbers", e.g., since numbers can be ordered from least to greatest and thus the greatest number is readily and unambiguously ascertainable—the greatest number is that number of the plurality of numbers which is greater than all other numbers of the plurality of numbers. Similarly, in an embodiment where there are two equal numbers, and both numbers are greater than all other numbers in the plurality, then there are two greatest numbers.

Where two or more terms or phrases are synonymous (e.g., because of an explicit statement that the terms or phrases are synonymous), instances of one such term or phrase do not mean instances of another such term or phrase must have a different meaning. For example, where a statement renders the meaning of "including" to be synonymous with "including but not limited to", the mere usage of the phrase "including but not limited to" does not mean that the term "including" means something other than "including but not limited to".

II. Determining

The term "determining" and grammatical variants thereof (e.g., to determine a price, determining a value, the determination of an object which meets a certain criterion) is used in an extremely broad sense. The term "determining" encompasses a wide variety of actions and therefore "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing, and the like.

The term "determining" does not imply certainty or absolute precision, and therefore "determining" can include estimating, extrapolating, predicting, heuristically "best guessing", averaging and the like.

The term "determining" does not imply that mathematical processing must be performed, and does not imply that numerical methods must be used, and does not imply that an algorithm is used.

The term "determining" does not imply that any particular device must be used. For example, a computer need not necessarily perform the determining.

III. Forms of Sentences

Where a limitation of a first claim would cover one of a feature as well as more than one of a feature (e.g., a limitation such as "at least one widget" covers one widget as well as more than one widget), and where in a second claim that depends on the first claim, the second claim uses a definite article "the" to refer to that limitation (e.g., "the widget"), this mere usage does not imply that the first claim covers only one of the features, and this does not imply that the second claim covers only one of the features (e.g., "the widget" can cover both one widget and more than one widget).

When an ordinal number (such as "first", "second", "third" and so on) is used as an adjective before a term, that ordinal number is used (unless expressly specified otherwise) merely to indicate a particular feature, such as to distinguish that particular feature from another feature that is described by the same term or by a similar term, but that ordinal number does not have any other meaning or limiting effect—it is merely a convenient name. For example, a "first widget" may be so named merely to distinguish it from, e.g., a "second widget". Thus, the mere usage of the ordinal numbers "first" and "second" before the term "widget" does not indicate any other relationship between the two widgets, and likewise does not indicate any other characteristics of either or both widgets. For example, the mere usage of the ordinal numbers "first" and "second" before the term "widget" (1) does not indicate that either widget comes before or after any other in order or location; (2) does not indicate that either widget occurs or acts before or after any other in time; and (3) does not indicate that either widget ranks above or below any other, as in importance or quality. Thus, the mere usage of the ordinal number "first" does not indicate that there must be a "second". For example, the use of the phrase "a first widget" does not imply that there be a second widget. Accordingly, it would not be ambiguous or indefinite to use in a claim the term "a first widget" where no "second widget" is recited in that claim (or in any other claim it depends on). The mere usage of the ordinal number "second" or greater ordinal numbers does not indicate that there must be a "first" or any lesser ordinal number. For example, the use of the phrase "a second plurality of widgets" does not imply that there be a first plurality of widgets. Accordingly, it would not be ambiguous or indefinite to use in a claim the term "a second plurality of widgets" where no "first plurality of widgets" is recited in that claim (or in any other claim it depends on). A term that is labeled by an ordinal number is different from a term that is not modified by any ordinal number. For example, in a claim a reference to "a green widget" and a reference to "a second green widget" means that there are references to different widgets and thus there is no ambiguity as to whether the second green widget is or is not a reference to the green widget. The mere usage of ordinal numbers does not define a numerical limit to the features identified with the ordinal numbers. For example, the mere usage of the ordinal numbers "first" and "second" before the term "widget" does not indicate that there are exactly two widgets.

When a single device, article or other product is described herein, in another embodiment more than one device or article (whether or not they cooperate) may alternatively be used in place of the single device or article that is described. Accordingly, the functionality that is described as being possessed by a device may alternatively be possessed by more than one device or article (whether or not they cooperate) in another embodiment.

Similarly, where more than one device, article or other product is described herein (whether or not they cooperate), in another embodiment a single device or article may alternatively be used in place of the more than one device or article that is described. For example, a plurality of computer-based devices may be substituted with a single computer-based device. (Conversely, a single computer-based device may be substituted with multiple computer-based devices operating in cooperation with one another.) Accordingly, the various functionality that is described as being possessed by more than one device or article may alternatively be possessed by a single device or article.

The functionality and/or the features of a single device that is described may, in another embodiment, be alternatively embodied by one or more other devices that are described but are not explicitly described as having such functionality or features. Thus, other embodiments need not include the described device itself, but rather can include the one or more other devices that would, in those other embodiments, have such functionality or features.

IV. Disclosed Examples and Terminology are not Limiting

Neither the Title (set forth at the beginning of the first page of the present application) nor the Abstract (set forth at the end of the present application) is to be taken as limiting in any way the scope of the disclosed invention, is to be used in interpreting the meaning of any claim or is to be used in limiting the scope of any claim. An Abstract has been included in this application merely because an Abstract is required under 37 C.F.R. § 1.72(b).

The headings of sections provided in the present application are for convenience only, and are not to be taken as limiting the disclosure in any way.

Numerous embodiments are described in the present application, and are presented for illustrative purposes only. The described embodiments are not, and are not intended to be, limiting in any sense. The disclosed inventions are widely applicable to numerous embodiments, as is readily apparent from the disclosure. One of ordinary skill in the art will recognize that the disclosed invention may be practiced with various modifications and alterations, such as structural, logical, software, and electrical modifications. Although particular features of the disclosed invention may be described with reference to one or more particular embodiments and/or drawings, it should be understood that such features are not limited to usage in the one or more particular embodiments or drawings with reference to which they are described, unless expressly specified otherwise.

Though an embodiment may be disclosed as including several features, other embodiments of the invention may include fewer than all such features. Thus, for example, a claim may be directed to less than the entire set of features in a disclosed embodiment, and such claim would not be interpreted as requiring features beyond those features that the claim expressly recites.

No embodiment of method steps or product elements described in the present application constitutes the invention claimed herein, or is essential to the invention claimed herein, or is coextensive with the invention claimed herein, except where it is either expressly stated to be so in this specification or (with respect to a claim and the invention defined by that claim) expressly recited in that claim.

Any preambles of the claims recite purposes, benefits and possible uses of the claimed invention only and do not limit the claimed invention.

The present disclosure is not a literal description of all embodiments of the invention. Also, the present disclosure is not a listing of features of the invention that must be present in all embodiments.

All disclosed embodiments are not necessarily covered by the claims (even including all pending, amended, issued and canceled claims) In addition, a disclosed embodiment may be (but need not necessarily be) covered by several claims. Accordingly, where a claim (regardless of whether pending, amended, issued or canceled) is directed to a particular embodiment, such is not evidence that the scope of other claims do not also cover that embodiment.

Devices that are described as in communication with each other need not be in continuous communication with each other, unless expressly specified otherwise. On the contrary, such devices need only transmit to each other as necessary or desirable, and may actually refrain from exchanging data most of the time. For example, a machine in communication with another machine via the Internet may not transmit data to the other machine for long periods of time (e.g., weeks at a time). In addition, devices that are in communication with each other may communicate directly or indirectly through one or more intermediaries. Devices are in communication with one another if they are capable of one-way communication with one another. For example, a first device and a second device may be in communication with one another if the first device is capable of transmitting information to the second device, and the second device is capable of receiving information from the first device.

A description of an embodiment with several components or features does not imply that all or even any of such components or features are required. On the contrary, a variety of optional components are described to illustrate the wide variety of possible embodiments of the present invention. Unless otherwise specified explicitly, no component or feature is essential or required.

Although process steps, algorithms or the like may be described or claimed in a particular sequential order, such processes may be configured to work in different orders. In other words, any sequence or order of steps that may be explicitly described or claimed does not necessarily indicate a requirement that the steps be performed in that order. The steps of processes described herein may be performed in any order possible. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to the invention, and does not imply that the illustrated process is preferred.

Although a process may be described as including a plurality of steps, that does not imply that all or any of the steps are preferred, essential or required. Various other embodiments within the scope of the described invention include other processes that omit some or all of the described steps. Unless otherwise specified explicitly, no step is essential or required.

Although a process may be described singly or without reference to other products or methods, in an embodiment the process may interact with other products or methods. For example, such interaction may include linking one business model to another business model. Such interaction may be provided to enhance the flexibility or desirability of the process.

Although a product may be described as including a plurality of components, aspects, qualities, characteristics and/or features, that does not indicate that any or all of the plurality are preferred, essential or required. Various other embodiments within the scope of the described invention include other products that omit some or all of the described plurality.

An enumerated list of items (which may or may not be numbered) does not imply that any or all of the items are mutually exclusive, unless expressly specified otherwise. Likewise, an enumerated list of items (which may or may not be numbered) does not imply that any or all of the items are comprehensive of any category, unless expressly specified otherwise. For example, the enumerated list "a computer, a laptop, and a PDA" does not imply that any or all of the three items of that list are mutually exclusive and does not imply that any or all of the three items of that list are comprehensive of any category.

An enumerated list of items (which may or may not be numbered) does not imply that any or all of the items are equivalent to each other or readily substituted for each other.

All embodiments are illustrative, and do not imply that the invention or any embodiments were made or performed, as the case may be.

V. Computing

It will be readily apparent to one of ordinary skill in the art that the various processes described herein may be implemented by, e.g., appropriately programmed general purpose computers, special purpose computers and computing devices. Typically a processor (e.g., one or more microprocessors, one or more microcontrollers, one or more digital signal processors) will receive instructions (e.g., from a memory or like device), and execute those instructions, thereby performing one or more processes defined by those instructions. Instructions may be embodied in, e.g., one or more computer programs, one or more scripts.

A "processor" means one or more microprocessors, central processing units (CPUs), computing devices, microcontrollers, digital signal processors, or like devices or any combination thereof, regardless of the architecture (e.g., chip-level multiprocessing or multi-core, RISC, CISC, Microprocessor without Interlocked Pipeline Stages, pipelining configuration, simultaneous multithreading).

A "computing device" means one or more microprocessors, central processing units (CPUs), computing devices, microcontrollers, digital signal processors, graphics card, mobile gaming device, or like devices or any combination thereof, regardless of the architecture (e.g., chip-level multiprocessing or multi-core, RISC, CISC, Microprocessor without Interlocked Pipeline Stages, pipelining configuration, simultaneous multithreading).

Thus a description of a process is likewise a description of an apparatus for performing the process. The apparatus that performs the process can include, e.g., a processor and those input devices and output devices that are appropriate to perform the process. For example, a description of a process is a description of an apparatus comprising a processor and memory that stores a program comprising instructions that, when executed by the processor, direct the processor to perform the process.

Further, programs that implement such methods (as well as other types of data) may be stored and transmitted using a variety of media (e.g., computer readable media) in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data (e.g., instructions, data structures) which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory (DRAM), which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

The term "tangible computer-readable medium" refers to a "computer-readable medium" that comprises a hardware component, such as optical or magnetic disks, semiconductor memory (e.g., RAM, ROM, flash drives, semiconductor hard drives).

Various forms of computer readable media may be involved in carrying data (e.g., sequences of instructions) to a processor. For example, data may be (i) delivered from RAM to a processor; (ii) carried over a wireless transmission medium; (iii) formatted and/or transmitted according to numerous formats, standards or protocols, such as Ethernet (or IEEE 802.3), SAP, ATP, Bluetooth, and TCPorIP, TDMA, CDMA, and 3G; and/or (iv) encrypted to ensure privacy or prevent fraud in any of a variety of ways well known in the art.

A "user interface" is 'used by' a device, such as a computing device, to provide outputs to a user and to receive inputs from a user. For example, the user interface may direct the device to display (or otherwise provide) certain outputs (as defined by the user interface), and allow inputs to be received from the user via the device. In an embodiment, in order for the device to generate the user interface, the device executes certain instructions, e.g., instructions to output data and receive data as inputs. A user interface can include one or more output controls which output data and/or one or more input controls which allow data to be received. A type of input control allows a selection of an option from among a plurality of options, and may allow only one option to be selected, may allow one or more options to be selected, may allow that a predetermined number of options are selected, may allow that no options are selected. An input control may define the format of type of input that may be entered. A control may function as both an input control and as an output control.

A description of different capabilities of a user interface (e.g., by describing different embodiments of a user interface, by describing different things that a user interface can do) does not mean that in all embodiments the user interface must include all such described capabilities. On the contrary, such description also supports an embodiment in which, e.g., a user interface has only one of the described capabilities, and supports an embodiment in which a user interface has a particular combination of less than all of the described capabilities.

A description of a process is likewise a description of a computer-readable medium storing a program for performing the process. The computer-readable medium can store (in any appropriate format) those program elements that are appropriate to perform the method. For example, a description of a process is a description of a computer-readable storage medium that stores a program comprising instructions that, when executed by a processor, direct the processor to perform the method.

Just as the description of various steps in a process does not indicate that all the described steps are required, embodiments of an apparatus include a computer or computing device operable to perform some (but not necessarily all) of the described process.

Likewise, just as the description of various steps in a process does not indicate that all the described steps are required, embodiments of a computer-readable medium storing a program or data structure include a computer-readable medium storing a program that, when executed, can cause a processor to perform some (but not necessarily all) of the described process.

Where databases are described, it will be understood by one of ordinary skill in the art that (i) alternative database structures to those described may be readily employed, and (ii) other memory structures besides databases may be readily employed. Any illustrations or descriptions of any sample databases presented herein are illustrative arrangements for stored representations of information. Any number of other arrangements may be employed besides those suggested by, e.g., tables illustrated in drawings or elsewhere. Similarly, any illustrated entries of the databases represent exemplary information only; one of ordinary skill in the art will understand that the number and content of the entries can be different from those described herein. Further, despite any depiction of the databases as tables, other formats (including relational databases, object-based models and/or distributed databases) could be used to store and manipulate the data types described herein. Likewise, object methods or behaviors of a database can be used to implement various processes, such as those described herein. In addition, the databases may, in a known manner, be stored locally or remotely from a device that accesses data in such a database.

Various embodiments can be configured to work in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

In an embodiment, a server computer or centralized authority may not be necessary or desirable. For example, the present invention may, in an embodiment, be practiced on one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention (e.g., a step is performed by or with the assistance of a human).

VI. Continuing Applications

The present disclosure provides, to one of ordinary skill in the art, an enabling description of several embodiments and/or inventions. Some of these embodiments and/or inventions may not be claimed in the present application, but may nevertheless be claimed in one or more continuing applications that claim the benefit of priority of the present application.

Applicants intend to file additional applications to pursue patents for subject matter that has been disclosed and enabled but not claimed in the present application.

VII. 35 U.S.C. § 112, Paragraph 6

In a claim, a limitation of the claim which includes the phrase "means for" or the phrase "step for" means that 35 U.S.C. § 112, paragraph 6, applies to that limitation.

In a claim, a limitation of the claim which does not include the phrase "means for" or the phrase "step for" means that 35 U.S.C. § 112, paragraph 6 does not apply to that limitation, regardless of whether that limitation recites a function without recitation of structure, material or acts for performing that function. For example, in a claim, the mere use of the phrase "step of" or the phrase "steps of" in referring to one or more steps of the claim or of another claim does not mean that 35 U.S.C. § 112, paragraph 6, applies to that step(s).

With respect to a means or a step for performing a specified function in accordance with 35 U.S.C. § 112, paragraph 6, the corresponding structure, material or acts described in the specification, and equivalents thereof, may perform additional functions as well as the specified function.

Computers, processors, computing devices and like products are structures that can perform a wide variety of functions. Such products can be operable to perform a specified function by executing one or more programs, such as a program stored in a memory device of that product or in a memory device which that product accesses. Unless expressly specified otherwise, such a program need not be based on any particular algorithm, such as any particular algorithm that might be disclosed in the present application. It is well known to one of ordinary skill in the art that a specified function may be implemented via different algorithms, and any of a number of different algorithms would be a mere design choice for carrying out the specified function.

Therefore, with respect to a means or a step for performing a specified function in accordance with 35 U.S.C. § 112, paragraph 6, structure corresponding to a specified function includes any product programmed to perform the specified function. Such structure includes programmed products which perform the function, regardless of whether such product is programmed with (i) a disclosed algorithm for performing the function, (ii) an algorithm that is similar to a disclosed algorithm, or (iii) a different algorithm for performing the function.

Where there is recited a means for performing a function that is a method, one structure for performing this method includes a computing device (e.g., a general purpose computer) that is programmed and/or configured with appropriate hardware to perform that function.

Also included is a computing device (e.g., a general purpose computer) that is programmed and/or configured with appropriate hardware to perform that function via other algorithms as would be understood by one of ordinary skill in the art.

VIII. Disclaimer

Numerous references to a particular embodiment do not indicate a disclaimer or disavowal, from the scope of the invention, of additional, different embodiments, and similarly references to the description of embodiments which all include a particular feature do not indicate a disclaimer or disavowal of embodiments which do not include that particular feature. A clear disclaimer or disavowal in the present application will explicitly refer to the scope of the invention as disclaiming or disavowing certain subject matter and will also be prefaced by a phrase such as "does not include" or "cannot perform".

IX. Incorporation By Reference

Any patent, patent application or other document referred to herein is incorporated by reference into this patent application as part of the present disclosure, but only for purposes of written description and enablement in accordance with 35 U.S.C. § 112, paragraph 1, and should in no way be used to limit, define, or otherwise construe any term of the present application, unless without such incorporation by reference, no ordinary meaning would have been ascertainable by a person of ordinary skill in the art. Conversely, the definitions and other subject matter explicitly set forth in this application should not be used to limit, define, or otherwise construe any term of any document incorporated herein by reference. Nothing explicitly set forth in this application should be interpreted as an admission or characterization of any prior art to this application.

Any incorporation by reference does not, in and of itself, imply any endorsement of, ratification of or acquiescence in any statements, opinions, arguments or characterizations contained in any incorporated patent, patent application or other document, unless explicitly specified otherwise in this patent application.

X. Prosecution History

In interpreting the present application (which includes the claims), one of ordinary skill in the art refers to the prosecution history of the present application, but not to the prosecution history of any other patent or patent application, regardless of whether there are other patent applications that are considered related to the present application, and regardless of whether there are other patent applications that share a claim of priority with the present application.

XI. Other Embodiments

1. Example Embodiment

In an embodiment, a device, such as a server or other computer, is referred to herein as the "system server", and allows a user to input personal information (e.g., the user's date of birth, zip code and annual income) and/or to have personal information sent to the system server and/or to authorize the system server to receive personal information. Advertisers can provide the user with advertisements that are based on that personal information (e.g., advertisements are "targeted" to the user based on that personal information). The advertisement can be provided by sending a message (e.g., an electronic mail message) to the user. The advertisers can pay the user for permitting this advertisement to be provided. In an embodiment, the user can withdraw his personal information, thereby preventing further advertisements that are based on that personal information. In an embodiment, the user can view the prices that he can be paid in exchange for allowing his various personal information to be used as the basis for advertisements provided to him.

Figure 2:
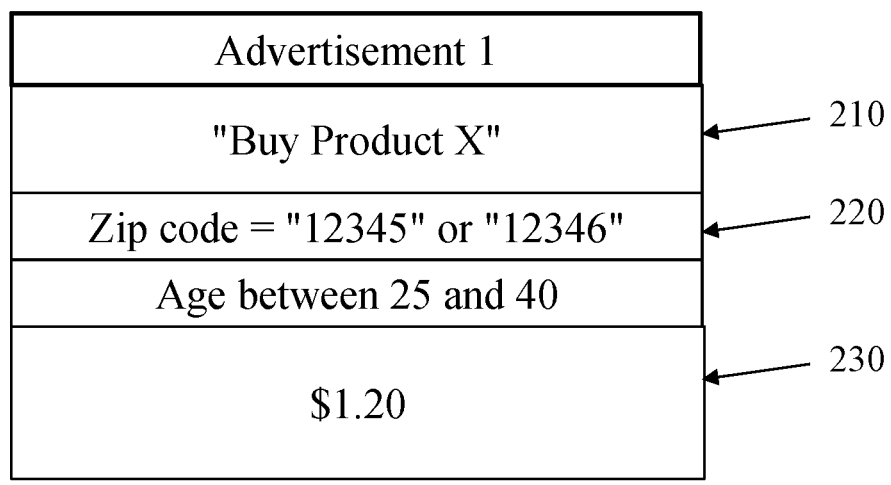
FIG. 2 depicts an example of an advertisement and corresponding personal information values and a price according to an embodiment.

Note that descriptions herein of functions performed by the system server and features of the system server likewise respectively describe, according to other embodiments, functions performed by and features of other devices that are not a server. For example, functions described as performed by the system server may, in different embodiments, be performed by a computer that is not a server, by a set of servers, by a set of computers, by another device, or by another set of devices.

with reference to FIG. 1, the embodiment that follows includes a device, such as the system server 10, that communicates with one or more advertiser devices 20 and communicates with one or more message devices 30 (e.g., email devices). According to this embodiment, the system server receives from the advertiser device one or more advertisements. FIG. 2 depicts an example advertisement 210 and associated information, according to an embodiment. For each advertisement, the system server also receives from the advertiser device at least one corresponding personal information value 220 (e.g., a zip code and a range of ages). The at least one personal information value can define a desired destination for the advertisement (e.g., users who live in that zip code and who have an age in that age range). For each advertisement, the system server also receives from the advertiser device a corresponding price 230. For example, for each of three advertisements received from the advertiser device corresponding prices (e.g., $1.00, $7.00, $0.30) are received.

The system server receives, from a first message device (e.g., a personal computer, a mobile phone, a smart phone), an identification of a user of a first email account. For example, the system server may receive from the first message device a user name (e.g., an alphanumeric string) and a password. This user name and password can be verified to be the user name and password of a particular email account (a "first email account"), and that email account corresponds to a particular user. The first email account has an account balance (e.g., the system server stores, with respect to the first email account, a balance such as an amount of money, points or other quantity that is credited to the account or that must be otherwise paid to the user of the account).

For each of a plurality of personal information types (e.g., for the type "zip code" and for the type "gender"), the system server calculates a corresponding price (e.g., a price of $1.00 for the type "zip code" and a price of $0.15 for the type "gender"). The price for a personal information type can be calculated, e.g., from prices that are received from advertiser devices and that correspond to the personal information type.

The system server instructs the first message device to display this plurality of personal information types and the corresponding prices, e.g., via a page in a web browser, via a window in an application. The system server then receives, from the first message device, a first set of personal information values of the user. For example, the first message device may send to the system server the following personal information values: the zip code "12345", the name "John Joseph Smith" and the date of birth "Jan. 1, 1980".

In this embodiment, the system server does not make the first set of personal information values available to any of the plurality of advertiser devices. For example, the system server may maintain the confidentiality of the first set of personal information values by not transmitting any such information to any devices which might result in revelation of that information to a third party.

The system server determines a first subset of the advertisements that match the first set of personal information values. For example, each of the advertisements in the first subset of advertisements has a corresponding personal information value (received from the advertiser device) that includes the zip code "12345" or includes the date of birth "Jan. 1, 1980".

The system server sends, to the first email account, a plurality of email messages (or other messages). Each of these email messages includes a respective advertisement of the subset of advertisements. An "advertisement message" is a message that includes an advertisement (e.g., generated by or on behalf of an advertiser). A type of advertisement message is an "email advertisement". An "email advertisement" is an email message that includes an advertisement. For example, in an embodiment an email advertisement includes text in its body in which the text defines an advertisement of an advertiser. In an embodiment, an email advertisement includes an image (e.g., a JPEG image) in its body in which the image defines an advertisement of an advertiser. In an embodiment, an email advertisement includes a link (e.g., an HTML hyperlink) in its body which, when activated, accesses additional content, such as a Web page.

The system server determines an amount to pay the user based on the prices corresponding to the subset of advertisements. The system server accordingly increases the account balance by this amount to pay the user.

A type of message is an electronic mail message (also referred to as an "email message"), regardless of format or protocol. Another type of message is an SMS (Short Messaging Service) message, regardless of format or protocol. Another type of message is an MMS (Multimedia Messaging Service) message, regardless of format or protocol. Other types of messages include any other text messaging messages, such as NTT Docomo's ShortMail and J-Phone's SkyMail. Another type of message is an instant messaging (IM) message, regardless of format or protocol. An IM message may be sent using any protocol, e.g., XMPP (eXtensible Messaging and Presence Protocol), SIP (Session Initiation Protocol), SIMPLE (SIP for Instant Messaging and Presence Leveraging Extensions). Another type of message is an audio message sent via a computer network (e.g., a .wav file, a .mp3 file) or via telephone (e.g., via landline network, cellular telephone network, VOIP network), regardless of format or protocol. An audio message may be stored (e.g., as a voicemail).

Other types of messages besides those explicitly referred to herein may be readily employed in the embodiments described herein. For example, an embodiment described as applicable to an email message is also applicable to another type of message.

Messages may include a variety of different types of content. For example, an email message may include text, audio, video, HTML code and/or links which permit websites and other content to be accessed.

Messages may be sent and/or received using any of a variety of different devices. For example, an email message or an SMS message may be sent by a personal computer, mobile telephone (also referred to as a "cell phone"), or a smart phone such as the phones of the BlackBerry Pearl™ 8100 series or the Apple iPhone series.

Messages may be sent using any of a variety of different software programs. For example, an IM message may be sent using a program (e.g., a Web-based program, a program installed on a personal computer's local hard drive) such as Windows Live Messenger, Yahoo! Messenger, AOL Instant Messenger, or Google Talk. An email message may be sent using a program (e.g., a Web-based program, a program installed on a personal computer's local hard drive) such as Google Gmail, another Webmail program, or Microsoft Outlook.

Messages may be received by any of a variety of different software programs and devices. In an embodiment, messages (e.g., advertisement messages) may be received by a game playing device (e.g., a personal computer or game console that executes a video game program), or by a server that coordinates play among a group of such playing devices. Messages can then be displayed or otherwise output to a user playing such a video game in any of a number of known manners. For example, the message may be displayed as a certain image layered on a three-dimensional object in the user's three dimensional game world, and in an embodiment that image might only be visible to the user even though other people are playing the same game and viewing generally the same three dimensional environment as the user. As another example, the message may be displayed as text displayed in the video game (e.g., informational text displayed when the user accesses a menu).

In an embodiment, messages may be received by a server of a web site, and disseminated to users that access that web site. For example, a server that manages a social networking web site (e.g., Facebook.com) may send messages to users that have accounts on that web site. Such messages may be accessed via the web site (e.g., via a messaging function of the web site, via another portion of the web site that can display such messages to the user).

A "message account" is an account that allows messages to be sent and/or allows messages to be received. A message account may include a way of identifying that account for receipt of messages. For example, in an embodiment an SMS message account may be identified by a telephone number.

In an embodiment, a message account allows one type of message (e.g., email messages) to be sent and/or received. In an embodiment, a message account may allow messages of different types (e.g., both SMS messages and MMS messages) to be sent and/or received. In an embodiment, a message account may process messages in different formats, and the transmission and reception of messages may be made according to various protocols.

In an embodiment, a message account requires some form of access verification or verification of the identity of the user of the message account. For example, a message account may require that a user of the message account first "log in" (e.g., provide a user name and a password that correspond to the user name and password for that message account, provide a biometric input such as a fingerprint read from a fingerprint reader, where the fingerprint corresponds to the user of that account) before the user is permitted to access some or all of the functions of the message account (e.g., the function of reading messages that have been received by the account, the function of sending messages from the account).

In an embodiment, a particular message account is accessible from a particular device and accordingly any user possessing the device may access some or all of the functions of the message account (e.g., without providing a user name and password). For example, a mobile telephone (or other device) may have a corresponding SMS message account, in which any SMS messages sent from the mobile telephone are sent from that SMS message account. The mobile telephone may not have any form of access verification or verification of the identity of the user, and accordingly any user possessing the mobile telephone may be able to use the mobile telephone to send SMS messages from the SMS message account that corresponds to the mobile telephone.

Some types of message accounts include email accounts, SMS message accounts, MMS message accounts, and IM message accounts.

An "email account" is an account that allows email messages to be sent and/or allows email messages to be received.

An email account typically includes a way of identifying the account for receipt of email messages. For example, a particular email account may have one or more corresponding email addresses (e.g., an alphanumeric text string such as "john@gmail.com"). In an embodiment, an email account includes a variety of settings, some or all of which are configurable by the user of the account. Some such settings direct, and/or affect features of, the user interface that is used to access the email account. An email account may also include functions or settings that are unrelated to email messages.

An embodiment described as applicable to an email account is also applicable to another type of message account.

An "email inbox" refers to any of a number of possible manners of organizing email messages that are received by an email account. For example, in an embodiment all email messages received by an email account are organized in a set referred to as the inbox of that email account. Similarly, all email messages sent by the email account may be organized in another set referred to as the outbox of that email account. In an embodiment, the set defined by the inbox of an email account may include none, some or all of the email messages received by the email account. In an embodiment, an inbox (and thus the email messages in the inbox) may be organized or divided into one or more subsets. For example, an email account may include one or more "folders" (e.g., different folders for email messages related to different projects or topics) and email messages in the inbox may be assigned to one of those folders.

In an embodiment, an email account may have a plurality of email inboxes. For example, an email account may have two inboxes, and an email message received by that email account may be assigned to one of the two inboxes. The selection of which inbox to assign an email message to may be based on the email message received, e.g., the content of the email message, the sender of the email message, tags or other indicia contained in the email message. In an embodiment, one inbox includes all email advertisements that are received, and the other inbox includes all other email messages that are received.

In an analogous manner, there can be a message inbox for a message account that is not an email account. An embodiment described as applicable to an email inbox is also applicable to another type of message inbox.

A "message device" is a device that is capable of receiving messages and/or of sending messages. In an embodiment, a message device is capable of displaying a message in human-readable form. In an embodiment, a message device is capable of providing functions that allow a user to create a message and then send that message.

A type of message device is a device that can access a message account and send or receive messages from that message account.

A type of message device is an email device. Similarly, other types of message devices are defined for corresponding types of messages.

An "email device" is any device that is capable of sending email messages and/or of receiving email messages.

For example, a type of email device is a device that can access an email account and send or receive email messages from that email account.

For example, a type of email device is a general purpose computer programmed with a client application such as Microsoft Outlook or Mozilla Thunderbird. As another example, a type of email device is a general purpose computer programmed (or other device) with a web browser or other software which is capable of accessing a remote email service (known as a "webmail" service), such as Google Gmail or Yahoo! Mail, that is offered by another device, such as a web server. Typically such a service is accessed by the email device via the Internet or via another network. An email device may be capable of both sending electronic mail messages and receiving electronic mail messages. In an embodiment, a user interface of the email device is partially generated by a browser or other software application executed by the advertiser device, while other parts of the user interface are generated by a server (e.g., a Webmail server) that directs the browser to output the user interface. Certain data that is employed by, or used to generate, the user interface of the advertiser device may be received from another device (e.g., from the system server).

An embodiment described as involving an email device may, in another embodiment, involve another type of message device. Similarly, an embodiment described as involving an email advertisement may, in another embodiment, involve another type of advertisement message. An embodiment described as involving an email account may, in another embodiment, involve another type of message account.

An "advertiser device" is any device that is capable of defining or specifying an advertisement message and/or transmitting the advertisement message (e.g., via a network to another device). In an embodiment, an advertiser device is a device (e.g., a programmed personal computer) that is capable of (1) outputting a user interface (e.g., outputting a graphical user interface in a web browser or other program) that allows entry of an advertisement (e.g., entry of text and/or graphics that define the advertisement, receipt of a file that represents the advertisement), (2) receiving the advertisement via the user interface, and (3) transmitting the advertisement via a network to another device (e.g., to the system server). In an embodiment, an advertiser device is capable of (1) outputting a user interface that allows entry of additional data, such as a corresponding price for the advertisement and a corresponding destination for the advertisement, (2) receiving via the user interface the additional data, and (3) transmitting the additional data via a network to another device.

In an embodiment, a user interface that is generated by an advertiser device is generated by a software application. In an embodiment, the user interface is generated by a software application executed by the advertiser device. In an embodiment, the user interface is partially generated by a browser or other software application executed by the advertiser device, and other parts of the user interface are generated by a server (e.g., a Webmail server) that directs the browser to output the user interface. Certain data that is employed by, or used to generate, the user interface of the advertiser device may be received from another device (e.g., from the system server).

2. Personal Information

In an embodiment, certain personal information of a user may be the sort of information that is typically considered extremely confidential Therefore, such information is the sort which many users would typically not allow to be made available, would not allow to be made available over the Internet, and/or would not allow to be received or used by advertisers.

In an embodiment in which the user can withdraw (e.g., from advertisers) different sorts of his personal information whenever desired, some users would be more willing to provide such personal information. In an embodiment in which the user can select which types of personal information are used by advertisers, some users would be more willing to provide such personal information.

With respect to a user, "personal information" can refer to any of various types of information about the user. Some categories of personal information are described in (a) through (u) below as are some examples of types of personal information in various categories:

(a) identity information—information (some of which is typically considered private or confidential) that helps ascertain the identity of a user, e.g., the user's name, home address, date of birth, social security number;

(b) demographic information—information that defines the user's inclusion in a population segment or in a demographic, e.g., race, ethnicity, gender, age, size of family, number of children, ages of children, extended family relationships, pets owned, national origin, social class, religion, annual income or income range, zip code of residence, job occupation, political affiliation, whether smoker or non-smoker, whether the user owns his home or rents, goods owned by the user, assets owned by the user, education, schools attended;

(c) geographic information—information that describes the geographic area of a residence of the user, or the geographic area of a place of work of the user, e.g., whether a particular area is urban, whether a particular area is suburban, whether a particular area is rural, population of a city or town, number of square miles of a city or town, population density of an area, climate of an area;

(d) professional activities—e.g., associations that the user is a member of;

(e) medical information—e.g., illnesses, doctors visited and when visited, conditions, diagnoses, hospitalizations, medications taken;

(f) interests information—e.g., what television shows the user enjoys, what songs the user enjoys, interests of children of the user, interests of other family members of the user;

(g) opinion information—e.g., the user's opinions about politics and political issues, opinions about businesses, opinions about industries, opinions about parenting, opinions about current events, opinions of children of the user, opinions of other family members of the user;

(h) family information—personal information of family members, such as children, size of family, number of children, ages of children, extended family relationships;

(i) email activity;

(j) message activity;

(k) purchase activity—e.g., what amounts the user has spent, with what merchants, what goods the user has purchased, the brands of goods the user has purchased, when the user made such purchases, frequency of purchases of a particular good or class of goods, other patterns of purchases, usage of credit card accounts and other payment accounts, frequency of usage of credit card and other payments accounts, benefits that the user derives or hopes to derive from a good that the user has purchased or will purchase, benefits that the user derives or hopes to derive from a set of goods that the user has purchased or will purchase;

(l) usage activity—e.g., the goods currently used by the user, the goods used in the past by the user, the brands of goods currently used by the user, the brands of goods used in the past by the user, the frequency of usage of goods used by the user, the frequency of usage of brands of goods used by the user, other patterns of usage of goods or of brands of goods;

(m) Web usage activity—e.g., online shopping habits of the user, web sites visited by the user;

(n) web site usage activity—with respect to a particular web site, the user's usage activity of that web site For example, the user's usage of a social networking site such as Facebook.com, including how often that site is accessed by the user and what activities the user performs on that site;

(o) test information—information regarding tests of the user, e.g., which tests such as the Scholastic Aptitude Test (SAT) or other standardized tests the user has taken, scores attained on particular tests taken by the user;

(p) location information—e.g., places visited by the user and times those places are visited, frequency of visits to places, businesses or establishments at the locations visited. Places visited may be determined by, e.g., the latitude and longitude as determined by a device carried by the user (e.g., a phone with a GPS receiver) or by a device used by the user (e.g., a car with a GPS receiver);

(q) contacts information—contact information (e.g., name, address, phone number, email address) of the user's friends, acquaintances, and professional contacts; other information stored in a contacts list, such as the contacts lists in Microsoft Outlook or in Google Gmail, or a stored set of names and numbers on a cellular telephone. A contact list may be, e.g., stored in the user's email account, or may be stored in the user's email device.

(r) recreational or leisure time activities of the user, recreational or leisure time activities of the user's children or other family members;

(s) company information—with respect to a company or business of the user, the number of employees of the company, the profits of the company, the revenue of the company, growth rate of the revenue or profit of the company, costs of the company, the frequency, magnitude and types of the company's purchases and expenditures, sensitivity of the company to the time to receive supplies or revenue, the industry the company is in, the role of the user in the company (e.g., whether the user is an employee of the company, whether the user consults for the company, whether the user manages or operates the company, whether the user controls the company, whether the user owns some or all of the company, whether the user can authorize purchasing decisions of the company, whether the user can initiate purchasing decisions of the company, the user's spending authority for the company);

(t) other information that is revealed by the user and/or other information that is entered by the user; and (u) other information that is known/ascertainable by the system, and for which authority to release such information to advertisers is required to be received from the user.

In an embodiment, there are types of personal information. For example, one type of personal information is the 'name', and another type of personal information is the 'date of birth'. With respect to a particular user, there can be an actual value for that type of personal information. For example, for a particular user, the value of the 'name' type is "John Joseph Smith" and the value of the 'date of birth' type is "Jan. 1, 1980". In other words, in this example two personal information values are "John Joseph Smith" and "Jan. 1, 1980", the personal information type that corresponds to the personal information value "John Joseph Smith" is the 'name' type, and the personal information type that corresponds to the personal information value "Jan. 1, 1980" is the 'date of birth' type. Each personal information value has a corresponding personal information type.

In light of all of the above, for any category of personal information (e.g., identity information) there can be types and values. For example, in an embodiment, one type of identity information is the "name". A type of personal information can belong to more than one category. For example, the type "zip code" may belong to the category "identity" and to the category "demographic". With respect to a particular user, there can be an actual value for that type of identity information. For example, for a particular user, the value of the 'name' identity information type is "John Joseph Smith". In other words, in this example the identity information value is "John Joseph Smith", and the identity information type that corresponds to the identity information value "John Joseph Smith" is the 'name' type. Each identity information value has a corresponding identity information type.

In an embodiment, a personal information value can define two or more personal information values. For example, the personal information value "August 1980" can define the thirty one values (e.g., values for a 'date of birth' personal information type) from "Aug. 1, 1980" to "Aug. 31, 1980".

In an embodiment, a personal information value can define a set of or range of personal information values. For example, the personal information value "from August 1980 to August 1985" can define the range of all of the values that are no earlier than "Aug. 1, 1980" and no later than "Aug. 31, 1985".

In an embodiment, a personal information value can define a portion included thereby. For example, a personal information value for the corresponding type "date of birth" (e.g., the personal information value "Jan. 1, 1980") can define a portion included thereby, such as the month and the day (e.g., "January 1"), but not the year, of that value. The month and the day together compose the "birthday". Thus the "date of birth" type can define a "birthday" type, and a value for the "date of birth" type can define a value for the "birthday" type.

For a given type of personal information (e.g., date of birth) a user or other entity may have entered (e.g., into a database, into a computing device via a keyboard and/or graphical user interface) a corresponding value (e.g., entered Jan. 1, 1980 as the date of birth), and the system server receives that value. In an embodiment, certain personal information values may be input (e.g., by the user, by a third party) and/or received (e.g., from an external data source), and those personal information values are not verified (possibly because the personal information values are not verifiable). In an embodiment, some personal information values are verified and/or validated, e.g., by a device or by a third party information source. For example, a user may purport to have residence in zip code "12345", and whether the user actually has a residence in that zip code might be verified, e.g., by receiving data from a separate source of information, such as public land records or public telephone records, and determining whether that received data reveals that the user's name is associated with a residence address that is in the zip code "12345". Verification of a personal information value can merely increase the probability that the personal information value is accurate or probative, and need not guarantee that the personal information value is accurate.

For example, a user may purport to have residence in zip code "12345", and whether the user actually has a residence in that zip code might be verified in a manner that increases the probability that the personal information value is accurate. For example, the user may be asked about the zip code of the residence several times over a period of weeks, and whether the answer to the questions are consistent is determined. As another example, the user may be asked questions regarding the purported zip code of the residence (e.g., "what company provides Internet service at your residence?") and the answers to those questions can be analyzed to determine if the answers are consistent with information about the zip code (e.g., whether the company in the user's answer actually services that zip code).

In an embodiment, a set of personal information values of a user may be defined such that the personal information values exclude advertisement preferences of the user. For example, if a user desires that advertisements he receives relate to particular sports of interest, then a set of personal information values may be defined to exclude those advertisement preferences (i.e., exclude the fact that the user desires that advertisements he receives relate to particular sports of interest). Such a set of personal information values could nevertheless include other personal information, such as particular sports that the user plays, has played or enjoys watching. Such personal information that excludes advertisement preferences could still be used, e.g., to provide advertisements that are targeted to the user. In an embodiment, an advertisement may be sent to the user using the other personal information but not using the advertisement preferences of the user.

As described above, advertisement messages (e.g., email advertisements) may be targeted to a user based on personal information of the user. In an embodiment, advertisement messages may be targeted to a user based on changes in personal information of the user. One such change is the initial entering of a personal information value for a personal information type. For example, a user may have decided to not enter his age, but eventually (perhaps after weeks of entering values for other personal information types) the user decides to enter his age.

Another change is where a first value has been entered for a personal information type, but then a different value is entered. This may indicate that the user has experienced some sort of change, and certain advertisers may desire to target advertisement messages to users experiencing such a change. For example, a user may have entered a home address, and then (perhaps months later) enters a different home address or zip code, which may indicate that the user has moved. The user may enter a new number of children, which may indicate that the user has a newborn. Similarly, the user may enter a new job occupation, annual income, home ownership status, or medication taken.

In an embodiment, advertisement messages are targeted to a user based on changes in personal information of the user and the value of the personal information before and/or after the change. For example, an advertisement message may be targeted to a user based on the fact that there is a change in the home address of the user, where home address was not in Manhattan before the change but is in Manhattan after the change.

2.1 Email Activity and Email Messages

As described above, advertisement messages (e.g., email advertisements) may be targeted to a user based on personal information of the user. In an embodiment, advertisement messages may be targeted to a user based on message activity of the user and/or of the user's message account.

With respect to a message account, a "message activity" is an activity that relates to the message account and/or to messages that are sent or received by the message account. Examples of message activity include (1) an activity that involves past usage of a message account,
(2) an activity that involves current usage of a message account, and
(3) something that is calculated, derived or otherwise determined from (1) and/or (2) above (e.g., calculation of averages of various past message usage and/or current usage).

Message activity includes the uses of a user interface that access the message account.

A type of message activity is email activity. The other types of message activity (e.g., SMS message activity) are likewise defined for corresponding types of messages (e.g., SMS messages).

With respect to an email account, an "email activity" is an activity that relates to the email account and/or to messages that are sent or received by the email account. Examples of email activity include (1) an activity that involves past usage of an email account,
(2) an activity that involves current usage of an email account, or
(3) something that is calculated, derived or otherwise determined from either or both of the two immediately preceding categories (1) and (2) (e.g., an average of the number of certain email activities per time period).

Email activity may be defined with respect to an email account, e.g., all email messages sent from the email account. Email activity may be defined with respect to a user, e.g., all email messages read by the user of an email account. Email activity may be defined with respect to a group of email accounts (e.g., all email accounts which have received a particular email advertisement). Email activity may be defined with respect to a group of users (e.g., all users for which certain data is available, all users within a defined category or otherwise meeting certain criteria).

Email activity may be defined with respect to a time period (e.g., email activity for a particular user between a first date and a second date, email activity for a particular user between a first time of thy and a second time of thy, email activity for a particular user within the last 30 days, email activity for a particular group of users within the last 30 days).

Examples of an email activity include whether the email account is a new account, whether the user has ever used the email account, and whether the user is currently using the email account for the first time.

Some other examples of email activities are "current email activities", "email activity times", and "email activity quantities", each of which is described below.

"Current email activities" include email activities that are presently occurring or have occurred recently. For an email activity, whether an event has occurred recently may be defined as desired, e.g., having occurred within a predetermined number of seconds. The following are examples of email activities referred to as current email activities:

That the user has accessed the email account (and therefore could be utilizing some or all of the functions of the email account) but the user is not currently utilizing any of the functions of the email account (e.g., the user has not opened an email or done anything else with the email account in more than a predetermined amount of time, such as sixty seconds);

That the user is currently opening email messages in the email account (e.g., the user has opened an email message in the email account within a predetermined amount of time, such as within sixty seconds);

That the user is currently reading an email message in the email account (e.g., the email message is currently being displayed to the user, such as via a window or portion of a window on an email device);

That the user is currently typing an email message in the email account (e.g., the user has been typing a new but unsent email message within a predetermined amount of time, such as within sixty seconds);

That the user is currently sending an email message from the email account (e.g., the user has sent an email message from the email account within a predetermined amount of time, such as sixty seconds);

That the user is currently opening a particular type of email in the email account (e.g., the user has opened an email advertisement in the email account within a predetermined amount of time, such as within sixty seconds);

That the user is currently accessing features of an email advertisement that is in the email account (e.g., the user has clicked on hyperlink in an email advertisement in the email account within a predetermined amount of time, such as within sixty seconds).

That the user is currently reading an email advertisement in the email account (e.g., the email advertisement is currently being displayed to the user, such as via a window or portion of a window on the email device);

"Email activity times" includes any sort of time (e.g., time of day, day of week, date, year) on which one or more email activities are determined to occur, and includes any sort of length of time (e.g., number of seconds, number of minutes, other durations) of one or more email activities. The following are examples of email activities referred to as email activity times:

The length of time that an email message is displayed;

The length of time that an email advertisement is displayed;

The time of day and/or date and/or day of week that an email message is opened;

The time of day and/or date and/or day of week that an email advertisement is opened;

The length of time between different email messages being opened (e.g., the length of time between consecutive openings of email messages, the length of time between consecutive openings of email advertisements);

The length of time that a user spends on content (e.g., a web page) that is accessed from an email advertisement (e.g., a hyperlink in an email advertisement that, when clicked, presents a web page or other content);

The length of time that a user spends between ceasing to utilize the email account (e.g., logging out of the email account) and next utilizing the email account (e.g., by logging in to the email account);

"Email activity quantities" include any quantity that may be determined (e.g., by calculating, measuring and/or aggregating) with respect to an email account and/or a user. The following are examples of email activities referred to as email activity quantities:

The number of email messages that are never opened;

The number of email advertisements that are never opened;

The number of email messages that are not opened within a predetermined time (e.g., within one week of being received, within one hour of being sent);

The number of email advertisements that are not opened within a predetermined time (e.g., within one week of being received, within one hour of being sent);

The percentage of email messages that are never opened;

The percentage of email advertisements that are never opened;

The percentage of email messages that are not opened within a predetermined time (e.g., within one week of being received, within one hour of being sent);

The percentage of email advertisements that are not opened within a predetermined time (e.g., within one week of being received, within one hour of being sent);

With respect to any email activity, various types of "email activity" include the number of particular email activities, as well as whether that number of emails has certain features (e.g., whether that number is equal to something, whether that number is less than something, whether that number is greater than something). For example, a type of email activity includes the number of times that the user has accessed the email account, and another type of email activity includes whether the number of times that the user has accessed the email account exceeds a predetermined number (e.g., the number seven).

With respect to any email activity, an email activity (including a quantity of particular email activities) can be defined with respect to any predetermined time period (e.g., the number of email messages sent within one week, the number of email messages sent between January 1 and June 1) or with respect to the time period that encompasses all such activities (e.g., the number of email messages ever sent). Similarly, with respect to any email activity, an email activity (including a quantity of particular email activities) can be defined with respect to any predetermined number of activities (e.g., the percentage of the last one hundred email advertisements sent that were opened). Similarly, such calculations can include combinations of email activities (e.g., the number of the last one hundred email advertisements sent that were displayed for more than fifteen seconds).

The various sorts of email activity may be determined by a single device or may be determined by a plurality of devices. Some sorts of email activity may be determined by a first device (e.g., a personal computer being used to access the email account), while other types of activity are determined by one or more devices other than the first device (e.g., the system server). Devices may cooperate with each other to determine a particular sort of email activity.

In an embodiment, various sorts of email activity may be determined by the message device of the user. For example, the message device of the user (e.g., by executing a software application such as an email client) can determine that an email message has been opened within the last sixty seconds, that an email message is currently being displayed, and/or that the user is currently typing an email message in the email account.

In an embodiment, various sorts of email activity may be determined by an email server. For example, the email server may determine that the user is currently sending an email message from the email account, and/or that an email message has been opened within the last sixty seconds.

In an embodiment, various sorts of email activity may be determined by a Webmail server. For example, the Webmail server may determine that the user is currently sending an email message from the email account, and/or that an email message has been opened within the last sixty seconds.

The above described embodiments of email activities are applicable to other types of messages besides email messages, and corresponding activities and embodiments described herein are defined for other types of messages besides email messages. For example, an example of SMS message activity is that the user is currently reading an SMS message in an SMS message account.

2.2. New Types of Personal Information

In an embodiment, various types of personal information are used by the system server. For example, particular types of personal information (e g, 'annual income', 'date of birth' and forty eight other particular types of personal information) are stored by, or are otherwise accessible by, the system server (e.g., the particular types of personal information are stored in a local or remote database which the system server is capable of accessing). Each of these particular types of personal information can be made available to at least one respective user (e.g., the user may be provided with a user interface that displays a question regarding the personal information type and/or that permits the user to input a personal information value corresponding to the personal information type). Each of these particular types of personal information can be made available to at least one respective advertiser (e.g., the advertiser may input that a particular advertisement is targeted based on the personal information type or based on a personal information value corresponding to the personal information type).

In an embodiment, a "new" type of personal information is a type of personal information that, at that time, the system server does not store or otherwise have access to. A new type of personal information may be created and made available to the system server, thereby permitting the system server, e.g., to make that new type of personal information available to a user and/or to an advertiser.

In an embodiment, a new type of personal information may be created and made available to the system server. For example, the system server may generate a user interface (e.g., that is used by a message device, by an advertiser device, or by another device), and the user interface can be configured to receive (e.g., from a user, from an advertiser, from an operator of the system server, from another entity) information regarding the new type of personal information. For example, the user interface can be configured to receive a description of the new type of personal information (e.g., a string of text that describes the type, such as the string "How many hours a week do you use the web site www.Facebook.com?" or the string "Marital Status").

The user interface can also be configured to receive additional information regarding the new type of personal information. For example, the user interface can also be configured to receive information defining one or more manners (including format) of inputting a personal information value that corresponds to the new type of personal information. Such information that defines a manner may include information that specifies, e.g., text entry (e.g., an indication that the personal information value is input using alphanumeric characters);

numerical entry (e.g., an indication that the personal information value is input using numeric characters);

a selection from among options (e.g., an indication that the personal information value is input by a selection of one, or any number including none, of a plurality of predefined options, and a description of each of the plurality of predefined options);

a selection of one or more points on an image (e.g., an indication that the personal information value is input by a selection of a point on an image, such as an image of a map, by clicking on that point or otherwise selecting that point);

a selection of one or more areas of an image (e.g., an indication that the personal information value is input by a selection of an area on an image by dragging with a mouse, clicking within the area or otherwise selecting an area); and a combination of one or more of the above.

For example, for the new type of personal information "Marital Status", the manner of inputting a personal information value that corresponds to the type "Marital Status" could be a selection of one option from the options "Unmarried" and "Married".

In an embodiment, additional information regarding the new type of personal information can define one or more restrictions on the personal information value that is input. For example, if the manner is numerical entry, there may be a restriction that the personal information value be within a predetermined range (e.g., between two particular numbers, greater than a particular number, less than a particular number). As another example, if the manner is text entry, there may be a limit on the number of alphanumeric characters that may be input. As another example, if the manner is text entry, there may be a pattern that the input alphanumeric characters must match.

In an embodiment, additional information regarding the new type of personal information can define actions to take if the personal information value that is received is determined to violate restrictions, or violate at least one of the restrictions. Examples of such actions include the system server performing at least one of the following:

provide a warning or alert (e.g., of the restriction that is violated);

not accept the personal information value;

provide an opportunity to reenter the personal information value; and not accept the personal information value unless it is confirmed (e.g., a user indicates acceptance of the personal information).

In an embodiment, the system server may be programmed or otherwise altered to include one or more new types of personal information, including any information regarding the new types of personal information (e.g., description, manner of inputting values, restrictions on values, actions to take upon violation of restrictions). In an embodiment, the system server directly or indirectly receives the one or more new types of personal information (including any information regarding the new types of personal information) via a user interface that is used by a device. In an embodiment, another device (besides the system server) directly or indirectly receives the one or more new types of personal information (including any information regarding the new types of personal information) via a user interface, and this other device stores information regarding the new types of personal information, where such information is available for use by the system server. For example, in an embodiment, types of personal information are stored in a database accessible to the system server, and the database can be augmented by the other devices by adding one or more new types of personal information to the database, making the new types of personal information available to the system server.

In an embodiment, an advertiser can enter a new type of personal information (e.g., using an advertiser device, by directing a third party to use a device) and can enter a corresponding price for this new type of personal information. The system server may provide this new type of personal information and its price to users. For example, the system server may instruct one or more message devices to display the new personal information type and the corresponding price, e.g., via a page in a web browser. In an embodiment, the price for the new type of personal information is offered to users in exchange for the user entering a personal information value that corresponds to the new type of personal information. In an embodiment, the price for the new type of personal information is offered to users in exchange for the user entering a corresponding personal information value that is then used to target an advertisement message to the user.

In an embodiment, a new type of personal information that is created by or received from an advertiser may be exclusively used (e.g., indefinitely, until a predetermined time, only during predetermined times) for that advertiser, and not for other advertisers. For example, the new type of personal information may not be made available to other advertisers, and other advertisers cannot target advertisements to users based on the new type of personal information. In an embodiment, the advertiser can be charged for such exclusive use of a new type of personal information.

In an embodiment, a new type of personal information that is created by or received from an advertiser may be used by some other advertisers or by all advertisers. For example, the new type of personal information may be made available to other advertisers, and other advertisers can target advertisements to users based on the new type of personal information. In an embodiment, the advertiser can be paid for creation of such a new type of personal information that other advertisers can use.

In an embodiment, a user can enter a new type of personal information (e.g., using an email device, by directing a third party to use a device). This user can also enter a corresponding price for this new type of personal information. Such a price might define, e.g., the minimum amount that this user would have to be paid in exchange for entering a value corresponding to this new type of personal information and allowing that value to be used, e.g., in targeting an advertisement message to the user (e.g., the minimum price to be paid in exchange for permitting such an advertisement message to be sent to the user, the minimum price to be paid in exchange for the user opening such an advertisement message, the minimum price to be paid in exchange for the user clicking on or otherwise activating a link or other control in such an advertisement message).

The system server may provide this new type of personal information and its price to advertisers. For example, the system server may instruct one or more advertiser devices (or other devices) to display the new personal information type and the corresponding price, e.g., via a page in a web browser. Advertisers may thereafter use this new type of personal information, e.g., in targeting advertisements to users. When displaying or otherwise providing the new personal information type to an advertiser, the advertiser can be informed that this type is a new type. For example, an informative message may be displayed, or the new type may be displayed differently (e.g., underlined, highlighted) than other types of personal information.

The system server may store information regarding the creation of the new type of personal information. For example, the system server may store the user that created the new type and when the new type was created. The system server may make such information available, e.g., to users, to advertisers. For example, when a user interface displays a type of personal information (e.g., via an email device, via an advertiser device) the user interface may also indicate the user that created the type (e.g., by displaying a textual name that the user entered to be an anonymous identifier).

In an embodiment, the system server may create a new type of personal information based on existing types of personal information. For example, the system server may employ one or more existing types of personal information, and the responses of users and advertisers to such existing types, to predict and estimate responses to a new type of personal information.

2.3. Removal of Types of Personal Information

In an embodiment, one or more types of personal information that, at that time, the system server stores or otherwise has access to may be "removed". The removed type of personal information would no longer be made available to the system server, and the system server, e.g., would no longer make that removed type of personal information available to a user and/or to an advertiser.

In an embodiment, the removed type is, upon removal, not stored or otherwise known to the system server. In an embodiment, the removed type is still stored or otherwise known to the system server, but the system server does not display the removed type, e.g., via user interfaces on advertiser devices, via user interfaces on email devices.

In an embodiment, the system server determines that a particular type of personal information should be removed. For example, the system server may determine that a particular type of personal information should be removed because that particular type is no longer useful. The system server may determine that a particular type of personal information is no longer useful based on, e.g., the number of users that do not input a value corresponding to the particular type, the number of advertisers that do not employ that particular type or values corresponding to that particular type in their advertisements.

In an embodiment, a new type of personal information may be introduced (e.g., "on trial"), and the new type may subsequently be removed (e.g., after a predetermined period of time, upon concluding that the performance of that new type is undesirable).

3. Prices of Personal Information

In an embodiment, for each of a plurality of personal information types, the system server calculates a price. The plurality of personal information types may be, e.g., all the types of personal information that are available to the system server. As another example, the plurality of personal information types may be selected by a user, or may be selected by the system server.

Each of the prices can be displayed or otherwise output. For example, the system server may instruct an email device to display the plurality of personal information types and the corresponding prices, e.g., in a table via a graphical user interface of the user's email account.

Figure 3:
FIG. 3 depicts an example set of personal information values and corresponding prices willing to be paid for entering those personal information values.

For example, with reference to FIG. 3, the email device of a user may display (e.g., in a window of a browser) the types and prices 300 below:

| | |
|---|---|
| $3.00 | ZIP CODE |
| $2.05 | NUMBER OF CHILDREN UNDER AGE 5 |
| $1.50 | EVER DIVORCED? |

In an embodiment, the system server can determine the price of a personal information type without reference to the user's corresponding personal information value that may be known or accessible to the system server. For example, the system server can determine the price of a personal information type 'zip code' and display such price to a user, without reference to the user's actual zip code which is known to the system server to be "12345". In other words, different users that have different zip codes (even if those zip codes are known to the system server to be different) would still have displayed to them the same price for the type 'zip code'.

In an embodiment, the system server can determine the price of a personal information type and display such price to a user based on the corresponding personal information value of the user that is known or accessible to the system server (and, in an embodiment, based on personal information values that correspond to other types). For example, the system server may determine the price of a personal information type 'zip code' based on the user's actual zip code which is known to the system server to be "12345", and display such price to the user. In other words, different users that have different zip codes (if those zip codes are known to the system server to be different) could have displayed to them different prices for the type 'zip code'. As another example, the system server may determine, and display to the user, the price of a personal information type 'zip code' based on (a) the user's actual zip code which is known to the system server to be "12345", and (b) the user's actual age which is known to the system server to be fifty.

A price corresponding to a type of personal information can be calculated in different ways. With respect to a plurality of types of personal information, each of the corresponding prices may be calculated in the same way. Alternatively, the corresponding prices of different types of personal information may be calculated in different ways.

In an embodiment, a price corresponding to a particular type of personal information can be calculated based on the respective prices of a particular subset of advertisements (e.g., prices which advertisers will pay in exchange for advertisement messages having their respective advertisements to be received by users matching the desired criteria). The particular subset can be determined in many ways. In an embodiment, the particular subset of advertisements includes only advertisements that have corresponding personal information values that match the particular personal information type. For example, a price corresponding to the particular type of personal information 'zip code' can be calculated based on the respective prices of a particular subset of advertisements, in which each advertisement in the particular subset has a corresponding personal information value such as "12345", "11111", and "33333" (i.e., a personal information value corresponding to the type 'zip code'). However, no advertisement in the particular subset fails to have at least one value corresponding to the type "zip code" (e.g., the particular subset would not include an advertisement with only the value "John Joseph Smith" of the 'name' type and the value "Jan. 1, 1980" of the 'date of birth' type).

In an embodiment, the price of a particular type of personal information is determined based on the particular user (e.g., the user to which the price is displayed or otherwise output), and the price can be calculated based on the user's personal information value that corresponds to the particular type. For example, with respect to a particular user, a price corresponding to the particular type of personal information 'zip code' can be calculated based on that particular user's personal information value (e.g., the user's zip code "12345").

As described above, a price corresponding to a particular type of personal information can be calculated based on the respective prices of a particular subset of advertisements. In an embodiment, the particular subset of advertisements includes only advertisements that have corresponding personal information values that match the personal information value of the particular user. For example, where the user has a zip code "12345", a price corresponding to the particular type of personal information 'zip code' can be calculated based on the respective prices of a particular subset of advertisements, in which each advertisement in the particular subset has a corresponding personal information value "12345" (i.e. a personal information value corresponding to the user's personal information value for the same type 'zip code'). However, no advertisement in the particular subset fails to have at least one value "12345" corresponding to the type "zip code" (e.g., the particular subset would not include an advertisement with only the value "11111" of the 'zip code' type and the value "Jan. 1, 1980" of the 'date of birth' type).

The respective price corresponding to each advertisement in the particular subset of advertisements can be determined, e.g., by accessing a database of advertisements and corresponding prices.

In calculating the corresponding price of the personal information type based (in whole or in part) on the respective prices of the particular subset of advertisements, the system server may employ all or less than all of the respective prices. For example, the corresponding price can be calculated to be the greatest of the respective prices of the particular subset, the average of the greatest seven (or other predetermined number) of the respective prices of the particular subset, the average of the tenth through third (or other predetermined numbers) greatest of the respective prices of the particular subset, or the third (or other predetermined number) greatest of the respective prices of the particular subset. Thus, the process by which advertisers submit prices for advertisements targeted to particular personal information values can essentially be considered an auction for those personal information values.

In an embodiment, the system server may calculate a range of prices corresponding to a particular type of personal information based on the respective prices of a particular subset of advertisements. For example, the lesser end of the range of prices can be calculated to be (i) the lowest price of the respective prices of the particular subset, (ii) the tenth (or any other predetermined ordinal number) lowest price of the respective prices of the particular subset, (iii) the average of the ten (or any other predetermined number) lowest of the respective prices of the particular subset, or (iv) the average of the tenth through third (or any other predetermined ordinal numbers) lowest of the respective prices of the particular subset. The greater end of the range of prices can be calculated in an analogous manner with reference to greatest prices rather than lowest prices.

In an embodiment, the price of the personal information type is based on the respective prices of the particular subset of advertisements (in any manner described herein) and is also based on some amount of desirable profit (e.g., to the owner of the system server). Thus, some of the amount that advertisers pay would be paid to another entity besides the user. For example, where the corresponding price is calculated based on the greatest of the respective prices (e.g., the greatest price, the greatest five prices) of the particular subset, the price can be a portion (e.g., 90%) of such amount. For example, where the greatest five prices are $10, $10, $10, $10 and $10, the price may be set to be 90% of $10 (i.e. $9). In such an embodiment, an advertiser would pay $10, e.g., to send a particular advertisement message to a user, and that user would receive $9 for receiving that advertisement message. The remaining $1 could be paid to one or more other entities (e.g., a company that owns the system server).

In an embodiment, the price of the personal information type is based on the respective prices of the particular subset of advertisements (in any manner described herein) and is also based on prices that users are willing to accept for such advertisements. For example, where a particular advertiser is willing to pay a particular price for a particular advertisement, and where one or more users already meet the criteria to receive such an advertisement, the price can be based on the lowest price willing to be accepted by any such users who already meet the criteria. For example, if a particular advertiser is willing to pay $10 for a particular advertisement to be received by a male age 35-45 in zip code "12345", and where several users have indicated that they are males age 35-45 in zip code "12345", the price can be based on the lowest price (e.g., the price can be $2 where two such users are willing to be paid just $2 for receiving an advertisement message, while the other users require more than $2 to receive an advertisement message). As another example, the price can be a weighted average of the lowest price and one or more prices of the particular subset of advertisements. For example, assume that a first advertiser is willing to pay $10 for a first advertisement to be received by a male age 35-45 in zip code "12345", and a second advertiser is willing to pay $9 for a second advertisement to be received by a male age 35-45 in zip code "12345". Also assume that several users have indicated that they are males age 35-45 in zip code "12345", and of such users the lowest they are willing to be paid for receiving an advertisement message is $2. The price can be based on a weighted average of the $2 and $10 (e.g., the price can be 90%*$2+10%*$10=$2.80).

The price corresponding to a particular type of personal information may be a particular number (e.g., $3), a range of numbers, a percentage of one or more other values (e.g., 20% more than the price without this type of personal information), or another manner of calculating the price.

Where the price an advertiser is willing to pay for an advertisement (the "advertiser's price") is greater than the price which the user is willing to be paid (the "user's price") for that advertisement (e.g., for receiving the advertisement, for reading the advertisement), the amount that the user is paid and the amount the advertiser pays can be set according to various methodologies. According to various embodiments, (a) the advertiser pays the user's price and the user is paid the user's price, (b) the advertiser pays the advertiser's price and the user is paid the advertiser's price, (c) the advertiser pays the advertiser's price and the user is paid the user's price, (d) the advertiser pays the advertiser's price and the user is paid an amount between the advertiser's price and the user's price, (e) the advertiser pays an amount between the advertiser's price and the user's price and the user is paid that amount, or (f) the advertiser pays an amount between the advertiser's price and the user's price and the user is paid a price less than that amount.

In an embodiment in which the amount the user is paid for the advertisement is less than the amount the advertiser pays for the advertisement, the difference between the two amounts could be paid to one or more other entities (e.g., a company that owns the system server).

In an embodiment, in addition to a price, an advertisement includes a corresponding maximum amount. The maximum amount defines the most that the advertiser is willing to pay for the advertisement. For example, the maximum price may be $100, and accordingly the advertiser is willing to pay no more than $100 for the advertisement. In an embodiment, the maximum price also includes a time period, and the maximum amount defines the most that the advertiser is willing to pay during a time period for the advertisement. For example, the maximum price may be $100 and the time period may be "each month", and accordingly the advertiser is willing to pay no more than $100 per month for the advertisement.

In an embodiment, where there is a maximum amount and once the advertiser has paid, or has become obliged to pay, the maximum amount, the system server thereafter prevents the advertisement from incurring further payments (e.g., by preventing the advertisement from being sent to users, by preventing the advertisement from being used as a basis for calculating prices for personal information). For example, where the maximum amount for an advertisement is $100 per month, and once $100 has been paid (or has been obliged to be paid) for the advertisement during a particular month, the system server can prevent the advertisement from accruing further charges (e.g., by thereafter preventing the advertisement from being sent to users during the month).

4. User Control of Personal Information

In an embodiment, a user can manage how his personal information is utilized, e.g., by the system server and by advertisers. For example, a user interface used by an email device or by another device can permit the user to:
- enter values for certain types of personal information;
- make those values of personal information available to the system server;
- make other values of personal information (besides values entered via the user interface) available to the system server;
- permit some or all values of personal information to be used by (released to) advertisers (e.g., for purposes of targeting advertisements to certain users based on the personal information of those users), even if such values are not available to advertisers (e.g., the advertisers do not actually receive the values, the advertisers receive but cannot actually read or understand the values, the advertisers cannot associate a user's values with a user, the advertisers cannot determine that two or more values for a user are for the same user);
- permit some or all values of personal information to be made available to advertisers; and/or
- display (or otherwise output) information regarding any or all of the above (e.g., display types of personal information for which a corresponding value has been entered, display types of personal information for which a corresponding value has not been entered, display values of personal information that have been entered, display values or types of personal information that have been released, display values or types of personal information that have not been released).

In an embodiment, the user interface may be generated or directed by the system server and displayed on the message device (e.g., via a browser or other application running on the message device). In an embodiment, the user interface may be generated by an application running on the message device.

4.1 Entering Personal Information

In an embodiment, a user interface, such as a graphical user interface used by an email device or other message device, permits a user to enter values corresponding to certain personal information types and/or to view additional information regarding personal information. In an embodiment, the user interface manages information of a particular user (e.g., a user corresponding to an email account, where the email account is accessible from the user interface). In an embodiment, such a user interface is generated by an email device, but any other device may generate such a user interface. In an embodiment, such a user interface includes, or is a part of the user interface that directs the operation of, an email account or performs functions of an email account (e.g., a user interface of a Webmail program such as Google Gmail). In an embodiment, the user interface does not direct the operation of an email account and does not perform functions of an email account. For example, such a user interface could permit a user to enter values for personal information into an personal information account, and such a personal information account need not be a part of or affiliated with any email account or message account (though such a personal information account and the personal information values stored could nevertheless be used, e.g., to direct advertisement emails to a particular email account of the user).

In an embodiment, the user interface can perform some or all of the following:

a. Display which types of personal information are being solicited. For example, the user interface can display (or otherwise output) a description of one or more types of personal information, such as all types stored by or accessible to the system server.

b. Display a subset of the types of personal information. For example, the user interface can display the types that meet certain criteria, such as the types that are newly added, the types that are popular, the types that meet criteria input by a user.

c. Display types of personal information for which a corresponding value has been entered. For example, with respect to a user, for each of a plurality of types of personal information (e.g., all personal information types stored by or accessible to the system server), the user interface can display (or otherwise output) the types of personal information for which corresponding values of the user have been entered (or otherwise made available) by the user or otherwise. In an embodiment, the user interface can display the types of personal information for which corresponding values have not been entered (or otherwise made available) as well as the types for which corresponding values have been entered (or otherwise made available), in which the types for which corresponding values have been entered or made available can be highlighted or otherwise distinguished from the types for which no corresponding values have been entered or made available. In an embodiment, the values that have been entered or made available are also displayed (e.g., adjacent to the corresponding types).

d. Display types of personal information for which a corresponding value has not been entered. For example, with respect to a user, for each of a plurality of types of personal information (e.g., all personal information types stored by or accessible to the system server), the user interface can display (or otherwise output) the types of personal information of the user for which corresponding values have not been entered (or otherwise made available) by the user or otherwise. In an embodiment, the user interface can display the types of personal information for which corresponding values have not been entered (or otherwise made available) as well as the types for which corresponding values have been entered (or otherwise made available), in which the types for which no corresponding values have been entered or made available can be highlighted or otherwise distinguished from the types for which corresponding values have been entered or made available.

e. Display values of personal information that have been entered. For example, with respect to a user, the user interface can display (or otherwise output) the values of personal information of the user that have been entered (or otherwise made available) by the user or otherwise. For such values, the user interface may also display the personal information types corresponding to the values (e.g., the type 'zip code' for the entered value "12345").

f. Display values or types of personal information that have been released. For example, with respect to a user, the user interface can display (or otherwise output) the values of personal information of the user that have been released (made available for use in targeting advertisements, such as by associating an advertisement with one or more values of personal information, in which such values define a destination for the advertisement) and/or the corresponding types for which values have been released.

g. Display values or types of personal information that have not been released. For example, with respect to a user, the user interface can display (or otherwise output) the values of personal information of the user that have not been released and/or the corresponding types for which values have not been released. In an embodiment, a value of personal information of the user can have been entered (or otherwise made available to the system server) but not released. For each such value or type, the value (if entered though not released) may also be displayed.

h. Permit personal information values to be entered and/or changed. For example, with respect to a user, for each of a plurality of types of personal information (e.g., all personal information types stored by or accessible to the system server), the user interface can display (or otherwise output) (i) the types of personal information for which corresponding values of the user have been entered (or otherwise made available) by the user or otherwise, as well as (ii) the types of personal information for which corresponding values of the user have not been entered (or otherwise made available). For a type for which there is no entered value, there can be an input control (e.g., adjacent to an output control that describes the type) that permits the user to enter a value corresponding to the type. Entered values can be changed, e.g., by the user entering different values in input controls. An input control that permits a value of a personal information to be changed may display the value before the change, or may be adjacent to a control that displays the value before the change.

i. Permit personal information values that are entered to be released. For example, with respect to a user, for each of a plurality of types of personal information (e.g., all personal information types stored by or accessible to the system server), the user interface can display (or otherwise output) (i) the types of personal information for which corresponding values of the user have been entered (or otherwise made available) by the user or otherwise, as well as (ii) whether such a corresponding value has been released.

j. Permit entry of a personal information value for any type that is displayed or otherwise output. In an embodiment, for each type of personal information that the user interface outputs, a corresponding value for that type may be entered, e.g., via an input control adjacent to a description of that type.

and/or k. a combination of some or all of the above

In an embodiment, the user interface performs a plurality the functions described above and provides one or more controls at the same time and/or via the same display. For example, the user interface can comprise a first plurality of output controls that display types of personal information for which a corresponding value has been entered, and a second plurality of output controls that display values or types of personal information that have not been released, in which both pluralities of output controls are displayed simultaneously.

In an embodiment, the user interface performs a plurality of the functions described above and provides one or more controls at different times. For example, the user interface can display a first plurality of output controls that display types of personal information for which a corresponding value has been entered, and then after displaying the first plurality display a second plurality of output controls that display values or types of personal information that have not been released.

In an embodiment, the user interface performs each of the above upon request. For example, a command (e g, which is initiated by using a menu item or a button on a graphical user interface) to display which types of personal information are being solicited can be received by the interface, and in response the user interface can display (or otherwise output) the types of personal information being solicited.

In an embodiment, the user interface provides predetermined choices regarding the above, permitting the user to select one or more of the choices. For example, the user may be provided with three choices (e.g., release all, release none, release only demographics) and selection of any of the choices controls the release of values that have been entered or that are otherwise available to the system server.

In an embodiment, the user interface permits the user to specify that all personal information values, or all personal information values that have not but will be entered, will be released for only a limited time and thereafter will be automatically withdrawn. For example, the user interface may permit the user to make all (or certain) personal information values available for a predetermined time (e.g., the next day, the next sixty seconds), and thereafter automatically withdraw those personal information values and/or render those personal information values inaccessible to the system server. As another example, the user interface may permit the user to make all (or certain) personal information values available for use in a predetermined number of email advertisements (e.g., one email advertisement), and thereafter automatically withdraw those personal information values and/or render those personal information values inaccessible to the system server.

The system server may manage the availability and release of personal information values according to the selected option. For example, where the user has specified that all personal information values are available for the next sixty seconds, the system server automatically withdraws the personal information values after sixty seconds has elapsed.

In an embodiment, the user may be provided with a reminder based on personal information values which have not been entered, or which are available to the system server but have not been released. For example, a graphical user interface used by an email device may display to a user a message indicating which personal information values have not been entered, and/or indicating an amount of payment the user would receive in exchange for releasing certain values that have not been released. Such reminders may be provided to the user, e.g., via a message, via a display in a graphical user interface.

In an embodiment, a plurality of devices provide the functions of the user interface that permits a user to enter values corresponding to certain personal information types and/or to view additional information regarding personal information. For example, the user may employ a first device to enter some personal information values, and may also (perhaps at a different time) employ a second device to enter additional personal information values. In an embodiment, the user may enter personal information values by employing (a) an email device (e.g., a personal computer or other device which provides access to a Webmail account) which generates a first user interface (e.g., a graphical user interface within a web browser), and also (b) a second device (e.g., a cellular telephone) which generates a second user interface (e.g., a text-only user interface that permits selection of options and entry of alphanumeric characters). The user may employ the first user interface and the second user interface to enter personal information values at different times. For example, the user may employ the first user interface to enter personal information values while at home and employ the second user interface to enter personal information values while traveling.

4.2 Permitting Personal Information to be Received

A user interface, such as a user interface as described above which permits entry of personal information, can be used to permit values for certain personal information types to be received (e.g., by the system server) or otherwise made available (e.g., to the system server). In such an embodiment, the system server may access personal information values of a user without such values being entered by the user, (or without such values being entered by the user again, where the user has previously entered values, e.g., into another system) and such values may be used, e.g., to target advertisement messages to the user. Such a user interface can also permit a user (or other entity) to view additional information regarding personal information.

In an embodiment, the user logs in, provides credentials (e.g., user name, password, identity codes, social security number), provides authorization (e.g., provides certain statements as required by law or regulation) or otherwise establishes that he is authorized to make certain personal information values available to the system server. The manner of establishing that a user is authorized to make certain personal information available to the system server may be different for different data sources. For example, a user might provide certain credentials (e.g., a first user name and a first password) with respect to a first data source (e.g., a web site) and might provide a particular type of authorization (e.g., provide a set of information and acknowledgments appropriate for a doctor to release the user's medical records to the system server) with respect to a second data source.

In an embodiment, the user provides identifying information (e.g., information sufficient to establish the identity of the user) so that information about the user can be obtained from a data source. For example, a data source may include publicly-available information about a user (e.g., whether the user has been named as a party to a bankruptcy proceeding), but the data source does not require authorization or permission from the user in order to obtain such information about the user. The identifying information (e.g., full name of the user and all present and past addresses) may be used to search for publicly-available information about that user (e.g., to search for any bankruptcy proceedings against a party with that name and one of the addresses).

Personal information can be obtained (e.g., by the system server directly or indirectly) from different types of data sources. In an embodiment, the system server establishes a session with a device (e.g., with a system server that stores particular records), the system server provides appropriate authorization information to the device, and the system server receives information from the device.

The following are some examples of data sources:
the user's computer or other device;
web sites, such as social networking sites and e-commerce sites, which may store users' accounts with the web site and/or users' activities using the web site;
credit card companies, which store records of transactions made with users' credit card accounts;
government entities, such as a department of motor vehicles, social security administration, passport agency, which may store a variety of information about users, including a mechanism (e.g., a driver's license number, a passport code) that uniquely identifies a user or that can be used in uniquely identifying a user;
doctors, hospitals and other medical services providers, which can store medical records of users;
repositories of tax forms or tax-related information (e.g., from Quicken, from TurboTax) of users;
land records indicating taxes due to be paid by a user and/or taxes paid by a user;
professional associations and other associations, which can provide verification of a user's membership in an association;
ISPs which store records of various Internet-related activities of a user;
telecommunications companies, which may store activity (e.g., phone activity) and/or charges (e.g., phone charges) of users;
pharmacy records, which can store prescription information of users;
merchants, which can store users' accounts with the merchant and/or users' purchases and other activities with the merchant;
online music stores and media stores, which can store users' downloads from the store;
town, state, federal records on information such as marriage, divorce, birth certificates of users or their families;
email accounts and other message accounts, which can store records of various email activity/message activity of users;
GPS devices (e.g., from phones, cars, laptops) and other devices which can store location information of users;
hotels which may store records of dates and locations of visits of users;
airlines, bus companies, rental car companies, other travel-related companies which may store dates and locations of users' itineraries;
contacts, e.g., from an electronic source such as Microsoft Outlook, Google Gmail, or a stored set of names and numbers on a cellular phone, which store mailing address, phone number, email address, company and/or other information about users' friends, acquaintances, colleagues and others;

For example, the user may permit his web usage activity and his web site usage activity to be available. In an embodiment, a Webmail system is integrated with or communicates with one or more other systems such as online shopping systems, online news systems, blogs, and other systems which can monitor or otherwise record some or all activities of the user on the Web. In such an embodiment, the Webmail system can receive authorization from the user to record (and/or make such personal information values available to the system server) activities such as which particular web sites the user visits, the amount of time the user spends at particular web sites, and what online purchases the user makes.

4.3 Integrity of User Information

In an embodiment, one or more mechanisms may be employed to prevent, minimize or deter certain actions regarding the entry by the user of personal information values. For example, the system server may (directly or indirectly) validate or attempt to validate personal information values entered by a user. For example, the system server may compare a personal information value entered by a user with other information (e.g., one or more other personal information values) entered by the user or otherwise available to the system server (e.g., from an external data source) to ascertain the consistency or relative likelihood of consistency of the personal information value.

In an embodiment, the system server may (directly or indirectly) prohibit, minimize or deter frequent changes in the values of personal information. For example, the system server may prevent changes, e.g., to the value of the 'zip code' type of a user, such that the value may not be changed more than a predetermined number of times in a predetermined time period (e.g., the value of the 'zip code' type may be changed no more than five times per year). The system server may, e.g., prevent changes in a value from being made based on the number of changes made by the user (and/or by other users) within a predetermined time period.

In an embodiment, the system server may warn the user based on the frequency of changes in a value of a personal information type of the user. For example, the system server may provide the user with a warning (e.g., via an email, via a display in a window of a graphical user interface), with the number of previous changes, and/or with the number of permitted changes (e.g., that only two more changes in the next six months will be permitted).

In an embodiment, the system server may store information regarding the frequency of changes. Such information may be used by advertisers to target advertisement messages to users. For example, an advertiser may specify that an email advertisement is to be sent only to users with value "12345" of the 'zip code' type, and only if that value has not been changed recently, or has not been changed more than four times in the last six months.

With respect to all of the above embodiments, the system server may perform its actions based on the type of personal information. For example, the user may be permitted to change the value of the zip code type up to four times per year, but may change the value of other types more frequently.

In an embodiment, where there is a delay before the system server permits a value of a personal information type to be changed, there can be a series of delays, such as a series of delays of increasing duration, between subsequent changes. For example, for a value of "zip code", the user may be permitted to change the value immediately, but after such a change the user would not be permitted to change the value for another week, and then if such a change were made within a week (or a small amount of time within a week), then the user would not be permitted to change the value for another month.

With respect to all of the above embodiments, rather than prevent a change in a personal information value, the system server may instead permit a change but prevent that (new) value from being used for advertisers to target advertisement messages, and/or prevent the user from otherwise being paid based on the (new) value. In such an embodiment, once a changed value is permitted to be so used (e.g., after expiration of a time period for delay in using changes to that value), the changed value, which has been entered and stored, may thereafter be so used automatically (without requiring further action from the user). The user may be so notified of such automatic conversion (e.g., after the expiration of a time period for delay).

In an embodiment, there can be a maximum number of times that certain values of personal information are permitted to be changed. For example, the system server may prevent more than four changes to the value of the 'gender' type or to the value of the 'date of birth' type. In an embodiment, the system server may warn the user based on the changes in a value of a personal information type. For example, the system server may provide the user with a warning (e.g., via an email, via a display in a window of a graphical user interface), with the number of previous changes, and/or with the number of permitted changes (e.g., that only two more changes will be permitted).

In an embodiment, for each of a plurality of values of personal information, the system server instructs the message device to display a plurality of personal information types and the corresponding prices, e.g., via a page in a web browser, via another application. The price may be based on the personal information value (e.g., $1 for zip code "12345" and $2 for zip code "11111"), or may not (e.g., $1 for entry of any street address).

In an embodiment, the system server may delay revealing the price for a type or for a value of a type, e.g., until a predetermined time after the user enters a value for that type. The delay, and whether there is any delay at all, can be based on the type of personal information and/or based on the value of the type of personal information (e.g., the value entered previously by the user or otherwise accessible by the system server).

4.4 Managing Advertisement Messages

In an embodiment, a user can manage various preferences and functions related to advertisement messages. For example, a user interface used by an email device or by another device can permit the user to enter any of various preferences described herein, which preferences are received by the system server and can be used by the system server in performing certain actions related to advertisement messages (e.g., performing the actions in accordance with the preferences). In an embodiment, such preferences of a user can be considered personal information and employed by the system server, e.g., for use in targeting advertisement messages to the user.

In an embodiment, the user interface can permit the entry of a maximum number of advertisement messages (including a maximum of zero, which means no such advertisement messages) to be received per time period (e.g., no more than ten advertisement messages per day, no more than five advertisement messages between 9:00 AM and 5:00 PM during work days).

In an embodiment, the user interface can specify time periods during which advertisement messages may be received (e.g., only during the hours of 11:30 AM and 1:00 PM, anytime except during the hours of 9:00 AM and 10:00 AM).

In an embodiment, the user interface can permit the entry of a maximum number of advertisement messages (including a maximum of zero, which means no such advertisement messages) having certain characteristics to be received per time period. The user interface may permit entry or specification of the characteristic. One such characteristic is the value to the user (e.g., price paid to the user) of the advertisement message, such as the amount the user is paid (e.g., by the system server) in exchange for receiving an advertisement message, for opening an advertisement message, or for clicking on or otherwise activating a link or other control in an advertisement message. There may be a plurality of such values, e.g., one amount that the user is paid in exchange for receiving an advertisement message, and another amount that the user is paid in exchange for opening an advertisement message, and another amount that the user is paid in exchange for clicking on or otherwise activating a link or other control in an advertisement message, and another amount that the user is paid in exchange for accessing a web site specified in the advertisement message. Thus, the user interface can permit the entry of a maximum number of advertisement messages having certain values to be received per time period (e.g., no more than five advertisement messages for which, when received, the user is paid less than $1 each, no more than twenty advertisement messages for which, when opened, the user is paid between $3 and $5 each).

The value to the user (e.g., price paid to the user) of an advertisement message may be a particular number (e.g., $3), a range of numbers, a percentage of one or more other values (e.g., 20% more than the value of another advertisement message), or another manner of calculating the value.

Another such characteristic of an advertisement message is the source of the advertisement message (e.g., the entity that sends the advertisement message, or the entity on whose behalf the advertisement message is sent). The user interface can permit the entry of a maximum number of advertisement messages from certain sources or from certain categories of sources (e.g., no more than three advertisement messages from company XYZ, no more than six advertisement messages from a car company, no advertisement messages at all from a company that sells children's goods). The user interface can permit the entry of a maximum number of advertisement messages per time from certain sources or from certain categories of sources (e.g., no more than three advertisement messages per day from company XYZ, no more than six advertisement messages per month from a car company).

In an embodiment, the user interface can permit combinations of functionality such as the functionality described above. For example, the user interface can permit the entry of a maximum number of advertisement messages per time having certain values and being from certain sources or from certain categories of sources (e.g., no more than three advertisement messages per day from a car company for which, when received, the user is paid less than $1 each; no more than five advertisement messages between 9:00 AM and 5:00 PM during work days for which, when received, the user is paid less than $1 each).

In an embodiment, the user interface can permit the entry of a maximum number of advertisement messages to be received, or to be received per time period, based on certain characteristics (whether or not those are characteristics of the advertisement messages). One such characteristic is the total value received by or receivable by the user, or the total value received by or receivable by the user per time period. For example, the total amount received by the user can be, or can be based on, the sum of all amounts that the user has been paid (e.g., for receiving and for opening advertisement messages, and clicking on links in advertisement messages).

As another example, the total amount received by the user per time period can be, or can be based on, the sum of all amounts that the user has been paid (e.g., for receiving and for opening advertisement messages) during a time period or that the user has been paid for activities (e.g., receiving and opening advertisement messages) during a time period, though payment may have been made outside that time period. Accordingly, the user interface can permit the entry of a maximum number of advertisement messages to be received, or to be received per time period, based on the total value received by or receivable by the user (e.g., no more than twenty advertisement messages if the total value received by the user is less than $10, no more than five advertisement messages per thy if the total value received by the user is between $15 and $20). The user interface can permit the entry of a maximum number of advertisement messages to be received, or to be received per time period, based on the total value received by or receivable by the user per time period (e.g., no more than twenty advertisement messages if the total value received this week by the user is less than $10, no more than five advertisement messages per day if the total value received this month by the user is between $15 and $20).

In an embodiment, a value is receivable by the user if, at a particular time, such value has not actually been paid to the user but the value would be received by the user once the user performs a particular action with respect to an advertisement message (e.g., the user clicks on a link that is included in an advertisement message, the user opens an email advertisement that has already been sent to the user's email account).

In an embodiment, the user interface can permit outputting of other information regarding email advertisements of all users, email advertisements of some users and/or email advertisements of one user. Such information may be determined by the system server from recorded activity regarding email advertisements for the user and/or email advertisements for other users.

For example, the user interface can output (e.g., display in text or in graphical form) information regarding past usage of advertisement messages (e.g., how many advertisement messages have been received by the user, how many advertisement messages have been opened by the user, how many advertisement messages had links or other controls that the user clicked on or otherwise activated, how many advertisement messages have been received but not opened by the user, the total number of advertisement messages that have been opened by all users). Such past usage that the user interface outputs may be all past usage, or usage during one or more periods of time (e.g., usage in the last year, usage between one year ago and two years ago, another period of time selected by the user, usage each month of the last six months).

As another example, the user interface can output (e.g., display in text or in graphical form) information regarding the total value received or receivable (e.g., by a user, by some users, by all users), or the total value received by or receivable by the user per time period. For example, the user interface can display the total value received by a user (e.g., in exchange for anything related to advertisement messages, in exchange for receiving advertisement messages, in exchange for opening advertisement messages). The user interface can display the total value which is receivable by a user (e.g., receivable due to the user's received but unopened advertisement messages)

4.5 Withdrawal of Personal Information

In an embodiment, a user interface can direct that certain values of personal information are to be withdrawn, and thus those withdrawn values are no longer released to advertisers. For example, a withdrawn value may not be used as a basis for targeting advertisement messages to users.

In an embodiment, a user interface that permits values of personal information to be withdrawn also permits values of personal information to be entered or otherwise permits values of personal information to be made available to the system server.

In an embodiment, a withdrawn value may remain stored, e.g., by the system server, in a database that is accessible to the system server.

In an embodiment, a withdrawn value may be rendered inaccessible to the system server. For example, the value may be removed from the system server's database, or the system server may be prevented from accessing that value (e.g., where the value is stored on another device which the system server may have access to), or the system server may be prevented from interpreting that value (e.g., where the value is encrypted and the system server cannot or does not decrypt the value).

In an embodiment, in order to effectuate such withdrawal of one or more values (e.g., values selected by the user via the user interface) of personal information, the user interface can, e.g., send a command that directs the system server to stop targeting advertisement messages using those values. In response to receiving the command, the system server may disregard those values of personal information in targeting advertisement messages to users.

In an embodiment, the user interface permits one or more values to be selected by the user. For example, the user interface may display a list of personal information values that the user has entered or otherwise made available to the system server. The user interface may also display the corresponding types of personal information, e.g., in which each type is displayed adjacent to the corresponding value. Selected types may then be, e.g., withdrawn or released, such as by a single action via a mouse or other input device.

In an embodiment, the user interface permits a group of values or all values to be withdrawn or to be released. For example, a single action such as a mouse click on a button of the user interface can initiate the withdrawal of all values of personal information.

In an embodiment, the user interface can output an indication of, for each of a plurality of types of personal information, whether a corresponding personal information value has been released, has not been released, has been entered but not released, has not been entered. For example, a type for which a corresponding personal information value has been released may be displayed via the user interface differently (e.g., in a different font or color) than a type for which a corresponding personal information value has been entered but not released.

In an embodiment, the user interface can output a history of withdrawals of values. For example, the user interface can display the dates and times at which, for a type of personal information, a corresponding value was released and withdrawn.

In an embodiment, a value that is withdrawn may nevertheless remain stored by or otherwise accessible to the system server. In an embodiment, a value that is withdrawn may be erased from the system server's storage (if it is stored by the system server) or may be otherwise rendered inaccessible to the system server (e.g., the system server may no longer be permitted to access that value where it is stored on a remote device). In an embodiment, a value that is withdrawn may be rendered inaccessible to the system server by encrypting the value. In an embodiment, a value that is withdrawn may be rendered inaccessible to the system server by preventing the system server from decrypting the value where the encrypted value is accessible to the system server (e.g., stored in a database that is accessible to the system server).

In an embodiment, a value that is encrypted may be decrypted with a "key" (e.g., a particular sequence of bits, numbers or characters). The key for an encrypted value may be stored in a manner that permits the user to (partially or completely) control the key. For example, the key may be stored on a user's device (e.g., on a user's computer, on a user's mobile phone, on a user's email device), or may be accessible via an account (e.g., an email account) of the user.

In an embodiment, the user can send the key to the system server, or can direct that the key is sent to or made available to the system server, thereby permitting the system server to decrypt the value. The system server may have the capability to access the stored key (e.g., where it is stored in a separate database that the system server can access) but must obtain authorization to access the stored key, and/or the system server's accesses to the key is recorded and/or audited, which can deter unauthorized accesses.

In an embodiment, the system server records, tracks and processes data regarding withdrawal and/or release of information by users. For example, for each user and/or for all users, the system server may determine, based on data regarding withdrawal and release of personal information values by users, data such as the following:

The average time between a user releasing a value and then withdrawing that value;

The average time between a user entering a value and then releasing that value;

The values and/or corresponding types of personal information that are withdrawn.

Potential revenue that is lost when withdrawal of personal information values prevents certain revenue from being made (e.g., by targeting advertisement messages to the user).

Potential revenue to be regained if certain personal information values are released again.

Targeting capabilities lost (e.g., by advertisers) when certain personal information values are withdrawn.

Correlation of actions and events that lead users to withdraw personal information values (e.g., upon receiving advertisement messages that are rated low, that are from certain advertisers or categories of advertisers, or that are generally unwanted).

Correlation of actions and events that lead users to release personal information values (e.g., amount of payment required, advertisement messages opened or received, changes in email activity).

Such data can be determined for various time periods (e.g., at all times, over the last year, over the last month).

5. Payments

In an embodiment, a user is paid (e.g., directly or indirectly by the system server) in exchange for various activities, such as receiving or opening advertisement messages. Determining that the user is due payment (e.g., because the user has performed an activity that earns the user a payment) may be performed in any of a number of manners and may be performed by any of various devices.

In an embodiment, an advertisement message includes data that indicates that the message is an advertisement message, and thus devices that receive, open or otherwise process the message may determine from this data that the message is an advertisement message. For example, a message may be determined to be an advertisement message because the message includes:

(i) a predetermined sequence of numbers (e.g., "123456789");

(ii) a predetermined sequence of alphanumeric characters (e.g., "WXYZ");

(iii) a predetermined pattern of numbers (e.g., a twenty digit sequence that begins with "12345");

(iv) a predetermined pattern of alphanumeric characters (e.g., a sequence that begins with "<ABC>" and ends with "</ABC>");

(v) a predetermined sequence or pattern of numbers or characters at a predetermined location in the message (e.g., starting after a particular portion of the message, starting before a particular portion of the message).

In an embodiment in which the user is to be paid a particular price in exchange for receiving a particular advertisement message, the message device of the user may determine that the particular advertisement message was received. For example, the message device may execute software (e.g., an email client application) that detects when messages are received, and such software also determines that a received message is an advertisement message.

Similarly, in an embodiment, an email server or other device besides the message device of the user may receive a message destined for the message device of the user, and may determine that the particular advertisement message was received and is addressed to the user. For example, messages destined for the message device of the user may also be received and/or processed by devices such as an email server of an email hosting company, an email server of a Webmail system, or a server that processes SMS messages for a set of users. Such a device may execute software that detects that messages are received, and such software also determines that a received message is an advertisement message.

In an embodiment, the system server sends, or directs another device to send, advertisement messages to one or more user devices on behalf of one or more advertisers. For example, in an embodiment, the system server receives, from an advertiser device, a plurality of advertisements and at least one corresponding personal information value for the advertisement. The system server then sends (or has sent) the advertisement in an advertisement message to users who have personal information values that match those personal information values. Therefore, the system server can readily determine which users were sent the advertisement messages, and such advertisement messages may be considered received by those users.

In an embodiment in which the user is to be paid a particular price in exchange for opening a particular advertisement message, the message device of the user may determine that the particular advertisement message was opened. For example, the message device may execute software (e.g., an email client application) that detects when messages are opened, and such software also determines that an opened message is an advertisement message.

Similarly, in an embodiment, a Webmail server, an email server or another device besides the message device of the user may determine that a message was opened and that the message was an advertisement message. For example, when a message is opened by the message device of the user, the message device may inform a device (e.g., an email server of an email hosting company, an email server of a Webmail system, or a server that processes SMS messages for a set of users) that the message was opened (e.g., so the message can be marked as 'read' rather than 'unread'). Such a device may also determine that a received message is an advertisement message.

In an embodiment, advertisement messages can be sent with an option that the advertisement message, when opened, triggers the generation of an indication by the message system that the advertisement message was read. For example, many email systems such as Microsoft Outlook permit an email message to be sent with an option that, when the email is opened, the email system that opened the email generates an email message (a "receipt") back to the sender informing the sender that the email message was read. Thus, advertisement messages may similarly be sent with such an option, so that when the advertisement message is opened, the system server may receive a receipt.

In an embodiment in which the user is to be paid a particular price in exchange for clicking on or otherwise activating a link or other control in a particular advertisement message, the message device of the user may determine that such control was activated. For example, the message device may execute software (e.g., an email client application) that detects when hyperlinks in messages are clicked on, and such software also determines that an opened message is an advertisement message.

In an embodiment, clicking on or otherwise activating a link or other control in a particular advertisement message may direct a software application on the message device to be executed. When executed, the software application can determine which control of the advertisement message was activated (e.g., because a unique identifier was provided to the software application) and can inform another device that the particular control was activated (e.g., by sending a message to a device such as the system server).

In an embodiment, clicking on or otherwise activating a link or other control in a particular advertisement message may direct the message device to communicate with a particular device or to access particular information. For example, clicking on a link may direct a web browser on the message device to access a particular web site (e.g., via a URL stored in the advertisement message) and to pass information to the web site (e.g., information embedded in the URL). The web server running the web site thus can determine (e.g., from the information passed via a URL) that a particular control was activated, and can inform another device that the particular control was activated (e.g., by sending a message to a device such as the system server).

The user may be paid in any of a number of ways. For example, the user may have payment credited to an account. Such an account may be an account maintained by a third party, e.g., a bank or credit card company, and may include, for example, a savings account, a checking account, or a credit card account. Such an account may be maintained by the system server, and may be, e.g., only credited by those payments that the user receives in exchange for advertisement messages. In an embodiment, the account is only usable for payment to the user, and is not usable for payments to others.

An account may be designated in any of a number of manners (e.g., by numerical identifiers that specify a bank and an account number at that bank).

The system server may increase the balance of an account. For example, where the account is maintained by a third party, the system server may increase the account balance by transferring payment to the account (e.g., by wire transfer to a savings account, by posting a credit to a credit card account).

In an embodiment, the user may, when desired, utilize the balance of the account (e.g., an account maintained by the system server) to obtain funds (e.g., receive a check, credit a credit card account, or credit a checking account), and the user specifies the amount of the funds (e.g., any amount equal to or less than the current balance of the account).

In an embodiment, the user is restricted in when he may utilize the balance of the account to obtain funds. For example, the user may be restricted to withdrawing funds only in certain amounts (e.g., only in multiples of $25, and thus only if the balance is at least $25), or the user may be restricted to withdrawing funds only at certain times (e.g., only on certain dates, only with a maximum frequency such as once per week, only a predetermined number of days after the balance has exceeded $10), or the user may be restricted to withdrawing funds only for certain purposes or payees (e.g., only as payment to certain merchants, only for purchases of certain goods or services, only for purchases made through advertisement messages).

In an embodiment, the balance can be reduced other than through payments made to the user or on behalf of the user. For example, the balance may be reduced according to a schedule (after two months of inactivity, the balance is reduced by a predetermined amount every month).

In an embodiment, a user interface (e.g., displayed via an email device) permits the user to manage the payment options described herein. In an embodiment, the user may specify that certain payment options occur automatically. For example, the user may specify that every time the balance of his account is at least $25, a check in the amount of $25 is to be sent. The system server, upon receiving from the user interface such a specification, could monitor the balance and direct that such a check be sent to the user when the appropriate balance is attained.

In an embodiment, the system server may make payments from a particular user's account, or can provide another device with information that permits the other device to make payments from a particular user's account. The system server may utilize this capability by providing users with the ability to readily make purchases via advertisement messages. For example, the system server may insert a hyperlink in an email advertisement, and when the hyperlink is clicked, the code for the hyperlink directs a device (e.g., the system server, a web server) to take payment (e.g., for a good the user wants to purchase) from the account.

6. Advertisers and Advertisements 6.1 Entering and Targeting Advertisements

As described above, the system server may receive, from a plurality of advertiser devices, a plurality of advertisements. The advertisements can be conveyed to the system server in any form, such as a computer file formatted according to a standard that defines the advertisement's content, desired destination (e.g., as defined by one or more personal information values), prices and other characteristics. The system server then can employ the received advertisements in advertisement messages sent to users, even without making the information, e.g., the personal information values of the users, available to the plurality of advertiser devices.

The advertiser device can permit entry of an advertisement. For example, the advertiser device may generate a user interface (e.g., by running software on the advertiser device, by running a browser that accesses data from the system server, so that the system server instructs the browser to generate the user interface).

In an embodiment, the user interface displays an input control that permits entry of at least one advertisement, at least one corresponding personal information value for each advertisement, and a corresponding price for each advertisement. For example, the user interface can permit entry of one or more advertisements (including for each advertisement the graphics, text and other data defining its appearance or other characteristics).

The user interface can permit, for each advertisement or for all advertisements, entry of one or more personal information values (e.g., the value "12345" for the 'zip code' type of personal information and the value "between 25 and 34" for the 'age' personal information type). In an embodiment these personal information values define the destination of the advertisement message. For example, the system server may send (or have sent) the advertisement in an advertisement message to those users who have personal information values that match all those personal information values of the advertisement (e.g., users who have released the value "12345" for their 'zip code' type of personal information and have released the value "between 25 and 34" for the 'age' personal information type). In other words, in this example, all of the plurality of personal information values of the advertisement match personal information values of the users receiving the advertisement. In another embodiment, merely one or more of the plurality of personal information values of the advertisement match personal information values of the users receiving the advertisement. For example, for an advertisement with the value "12345" for the 'zip code' type of personal information and the value "between 25 and 34" for the 'age' personal information type, the advertisement may be sent to a user who has released either the value "12345" for their 'zip code' type of personal information or has released the value "between 25 and 34" for the 'age' personal information type, though not necessarily both.

In an embodiment, the destination of the advertisement message is defined by a combination of the personal information values of an advertisement and other information provided to the system server. For example, in an embodiment, the destination of the advertisement message is defined by a combination of the personal information values of an advertisement and the user's interest in a good. In such an embodiment, the user may be permitted to specify interest in purchasing a particular good (e.g., an airline ticket to California, a four door economy car) or a particular category of good (e.g., a vacation package, a car). The user may specify such interest using the user interface that also permits entry of personal information values. The user may specify such interest by entering data via a user interface of another device, or via another user interface of the same device. The user may specify his interest by entering text (e.g., text which describes a particular good the user has an interest in purchasing). The user may specify his interest by selecting from a list (e.g., of goods and categories of goods) provided to him via the user interface. Items in such a list may be generated by the system server, and may have been received from advertisers or other entities.

In an embodiment in which the destination of the advertisement message is defined by a combination of the personal information values of an advertisement and the user's interest in a good, an advertiser may specify (e.g., using the user interface of the advertiser device) that an advertisement is to be sent to users that have an interest in a particular good and that have certain personal information values. For example, an advertiser may specify that a particular advertisement for a particular make and model of car is provided to users that have specified an interest in purchasing a car and have a value "over $100,000" for the personal information type "annual income".

Some types of personal information (e.g., name, social security number) relate to the identity of the user. In an embodiment, the user may release personal information values (typically in exchange for a sufficient price to be paid) sufficient to allow himself to be identified, and the user thereby permits advertisers to target advertisements to him (as opposed to targeting advertisements to any users with particular personal information values). In an embodiment, the user interface of the advertiser device provides a list of such identifiable users (e.g., by name and address, by anonymous identifier), and for each such user provides the personal information values and required price to target advertisements to such user. In an embodiment, the user interface of the advertiser device does not provide the advertiser with personal information values relate to the identity of the user unless the advertiser first pays (e.g., pays the user a price specified by the user, pays another entity a fee).

The user interface can permit, for each advertisement or for all advertisements, entry of at least one price for the advertisement. For example, the user interface can permit entry of a price that the advertiser will pay for each advertisement message having the advertisement that is received by a user matching the desired criteria (e.g., users having values that match the personal information values entered). The user interface can permit entry of a price that the advertiser will pay for each advertisement message having the advertisement that is opened by a user matching the desired criteria (e.g., users having values that match the personal information values entered). Other prices in exchange for other actions can be entered in various embodiments.

In an embodiment, the user interface displays an input control that permits transmission, by the advertiser device, of a command to send. In an embodiment where the user interface is generated by the system server (e.g., a user interface via a browser on the advertiser device), such a command directs the advertiser device to send to the system server the advertisements, values and prices from the advertiser device. In an embodiment where the user interface is generated by the system server (e.g., a user interface via a browser on the advertiser device), such a command, when received by the system server, directs the system server to receive the advertisements, values and prices from the advertiser device.

In an embodiment, the advertiser device can display prices of interest to the advertiser. For example, the advertiser device can display the current or past prices that other advertisers pay for targeting certain types of users.

In an embodiment, a user interface used by an advertiser device can display prices (e.g., prevailing prices paid by other advertisers or willing to be paid by other advertisers) for various sets of personal information values. The user interface can permit entry of one or more personal information values, and the user interface then displays (or otherwise outputs) the corresponding prices.

In an embodiment, the system server determines such prices by determining a subset of the advertisements (e.g., a subset of the advertisements entered by all advertisers) that match a set of personal information values (e.g., the personal information values received from a particular advertiser device). The system server determines the corresponding prices of the second subset of the advertisements, and also determines the highest price of these corresponding prices. The system server outputs (e.g., displays) highest price via the advertiser device, along with the set of personal information values.

6.2 Advertiser Campaigns

Advertisers can employ advertisement messages in furthering any of a variety of goals, and the user interface of the advertiser device can organize information and functionality tailored to such goals. In an embodiment, the advertiser can select a particular goal and the user interface of the advertiser device is configured to organize information and functionality tailored to that goal.

For example, one possible goal of an advertiser is to generate and/or ascertain awareness (e.g., awareness of a brand, awareness of a good). Accordingly, the user interface of the advertiser device may display, for a particular email advertisement or group of email advertisements, the number of users who opened such email advertisements. Also, the user interface may permit such users who opened such email advertisements to be saved, counted, named and designated as a group (e.g., to receive additional email advertisements).

Where the goal of an advertiser is to generate and/or ascertain awareness of a good (e.g., a particular medical product, a particular movie, services of a particular company), the user interface of the advertiser device may facilitate providing the user with a good (possibly but not necessarily the particular good in question). For example, where the particular good is a movie, the user interface may facilitate providing videos of one or more movie previews to the user (e.g., via a video embedded in an advertisement email, via a link in an advertisement email that, when clicked, directs the web browser to access a web site that displays the movie preview). The user interface may permit each of various groups of users (e.g., users who received but didn't open such email advertisements, users who opened such email advertisements but didn't view the video, users who viewed the video) to be saved, counted, named and designated as a group. As another example, the advertiser device may facilitate providing the user with a free sample of a good. Where the free sample can be delivered electronically (e.g., software used on trial for a limited time) the email device may be provided with the free sample, e.g., via a web browser or other manner of accessing a network to receive the free sample. Where the free sample is to be delivered by post (e.g., to the user's residence) the user interface may permit each of various groups of users (e.g., users who received but didn't open such email advertisements, users who opened such email advertisements but didn't request a free sample, users who requested a free sample, users who requested a free sample and then purchased the good) to be saved, counted, named and designated as a group.

Where the goal of an advertiser is to generate and/or ascertain awareness of a good or brand, users may be grouped according to the users' exposure (to a particular brand or good). Accordingly, the user interface of the advertiser device may facilitate grouping such users. For example, the user interface may permit the entry of various criteria for assigning users to groups (e.g., by designating as a group all users who have opened at least three of ten particular email advertisements, by designating as a group all users who have opened the same number of ten particular email advertisements). The user interface may permit such groups to be processed. For example, particular email advertisements can be sent to users in a particular group, and/or users in a particular group can be prompted to (e.g., asked to, offered payment to) indicate preferences (e.g., brand preferences) or intentions (e.g., intentions to purchase particular products).

6.3 Other Advertiser Options

The user interface of the advertiser device can permit entry of various criteria for advertisements. One criterion for advertisements is how the advertisements are displayed to users. For example, the user interface can permit entry of display options for the advertisement. The advertiser may have to pay an additional amount for certain options (e.g., pay a fixed price, pay a price that exceeds the bid prices of other advertisers) and such price can be displayed to the advertiser.

For example, a display option is that an advertisement message is to be displayed at the top of the user's inbox or otherwise is to be displayed to the user in a manner that distinguishes the advertisement from other advertisement messages (e.g., in a different color font). Another display option is that an advertisement message is to be displayed to the user (e.g., appear in an inbox of the user) based on certain email activity of the user (e.g., when the user has launched his email application, when the user is actively reading email, when the user is actively opening email advertisements, when the user is reading email for the first time ever or for the first time today). Another display option is that the advertisement message is received by the user before other advertisement messages are received by the user. For example, an advertiser can pay so that its advertisement message is received by users one day before those users receive any other advertisement messages (or any advertisement messages of a particular type), which tends to assure that the advertisement message will be more prominent and more likely to be considered, opened, etc. As another example, an advertiser can pay so that its advertisement message is the first advertisement message (or the first advertisement message of a particular type) that the users receive in a day.

In other embodiments, display options can be of any nature even if not commonly found in email programs or other message programs. For example, another display option would be to display an advertisement in a pop up window with interesting graphics, to play an audio file with the advertisement, to display the advertisement when certain activities on the message device occur (e.g., when a web browser accesses a particular web site).

6.4 Types of Advertisements

An advertisement may be completely specified by the advertiser. For example, the appearance of an advertisement may be completely defined by, e.g., text and graphics specified by the advertiser.

In an embodiment, the user interface of an advertiser device permits entry of an advertisement that includes variable portions subject to modification, e.g., by the system server. For example, the advertisement can include portions that are modified by data that is available as of the time the advertisement message is sent or is opened. Such an advertisement message may include, e.g., the current date, the current weather in a particular area, text or images currently on a particular web site, or something based on the personal information values of the user. Such an advertisement message may include any information that is updated as desired by the advertiser (e.g., to include the latest textual message the advertiser desires to send to users).

In an embodiment, a sequence of related advertisements can be directed to a user. For example, an advertiser can choose to send a sequence of related advertisement messages over time, such that a user experiences the advertisement messages in the sequence defined by the advertiser. Such advertisements can have a temporal feature, such that one advertisement naturally should be viewed after another advertisement.

The system server may determine which advertisements in such sequence have already been opened or otherwise viewed by the user, and thus the system server may determine which is the next advertisement to have that user view. Such advertisements that occur in a sequence can be highlighted to the user in some manner (e.g., displayed in the inbox in a different font), so the user knows the next installment in the sequence is available for viewing. The advertisements can be opened and displayed in the desired sequence regardless of the order in which particular advertisement messages are opened. For example, each of the advertisement messages may simply indicate the sequence and the next advertisement in the sequence the user has not viewed can be shown, regardless of which exactly advertisement message is opened.

A sequence of related advertisements can be based on the advertisements or sequence of advertisements of other advertisers. For example, a sequence of related advertisements from a first advertiser can be sent to a user.

The embodiments described herein as applicable to advertisements and messages that include advertisements may also be employed with communications that might not be considered advertisements, and may be sent on behalf of entities that might not be considered to be "advertisers". For example, instead of (or in addition to) an advertisement, a message employed in the embodiments described herein may include a press release, news item, public service announcement, review, opinion, sales promotion such as a coupon, survey, and/or invitation (e.g., to an event, to request further information, to request a phone call or other communication).

In an embodiment, the system server includes in a message some or all of the content of a web site. For example, the system server may include in a message some text and/or images from a web site at a particular URL. Where the web site (e.g., a blog) is frequently updated, or where users may be interested in knowing when the web site has been updated, the new content (e.g., the text of the latest entry of a blog) can be provided in a message. Thus, for example, the owner of a blog can pay users to read the latest blog entries.

The system server (or another device) can obtain some or all of the content of a web site and include that content in a message. In an embodiment, the system server (or another device) can obtain such content by accessing the web site and copying (also known as "scraping") the content from the web site. In an embodiment, the system server (or another device) can receive such content from a device that generates content for the web site. For example, a software application that is used to author a blog or other web site can upload new content to the web site and also to the system server. In an embodiment, the system server (or another device) can receive such content via an RSS feed or other feed the web site employs to indicate that updates are available. As another example, a server that receives web site updates (e.g., updates to the Twitter web site) from a cell phone or other device can generate and upload new content to the web site and also to the system server.

6.5 Rating Advertisements

In an embodiment, a user can rate an advertisement (e.g., via a user interface on the user's message device), and the ratings of users are available to other users (e.g., other users who have received or opened such an advertisement) and to advertisers (e.g., the advertiser from which the advertisement originated).

In an embodiment, the ratings of a first advertisement by a plurality of users (e.g., by all users who have rated the first advertisement) are received by the system server and the system server makes the ratings (or a synopsis of the ratings such as the average of all ratings) available to users who subsequently receive the advertisement. The rating of an advertisement may be displayed alongside the advertisement message when it is opened and/or when it is received.

In an embodiment, with each advertisement message that is opened by a user, the message device permits entry of a rating for that advertisement. In an embodiment, each rating of a plurality of advertisement messages is selected from the same set of choices (e.g., the set of one star, two stars, and three stars).

6.6 Management by Advertisers

For each advertisement entered by the advertiser, the user interface of the advertiser device can permit the display of various performance measurements (which may be calculated by the system server or by another device). For example, for each advertisement, the user interface can display:

The number of users who received the advertisement message;

The percentage of all users in the target (e.g., the target defined by the corresponding personal information values entered by the advertiser) who received the advertisement message;

The number and/or percentage of all users in the target who opened the advertisement message;

The number and/or percentage of users who received the advertisement message that also opened it;

The number and/or percentage of users who received the advertisement message but did not open it;

The average time (or other synopsis of the times) between a user receiving and the user opening the advertisement message;

The number of times a user re-opens the advertisement message;

The number and/or percentage of users who opened the advertisement message but did not click on a hyperlink or other control in the advertisement message;

The number and/or percentage of users who clicked on a hyperlink or other control in the advertisement message;

The amount paid (e.g., for all instances of the advertisement, for instances during a particular period of time, to users having certain characteristics);

For such performance measurements, the user interface can also display the corresponding performance measurement of other advertisements, of all advertisements of the advertiser or all advertisements of all advertisers. For example, the user interface can display, for an advertiser's advertisement, (1) the percentage of users in the target who opened the advertisement message, and (2) the percentage of all users in that target who opened all advertisement messages targeted at that target. As another example, the user interface can display, for an advertiser's advertisement, (1) the average time between a user receiving and the user opening the advertisement message, and (2) the average time between a user receiving and the user opening all advertisement messages.

The user interface can display performance measurements for an advertisement or plurality of advertisements with respect to different groups of users. For example, the user interface may display the number of users in each of the following groups who received the advertisement message: users under the age of 35, users age 35 to 55, users over the age of 55, users for whom the age is not known.

Such groups of users may be defined by any criteria desirable, such as by personal information of the users or by past interaction between the user and the advertiser (e.g., via advertisement messages).

In an embodiment, as described above, individual users may be identifiable (e.g., by name and address, by anonymous identifier), and the user interface can display performance measurements for an advertisement or plurality of advertisements with respect to individual users.

With respect to an advertisement (or a plurality of advertisements), the user interface can display information regarding the users' activities (e.g., Web usage activity, email activity, purchase activity) or changes in the users' activities that occur after the users open email advertisements. In an embodiment, the user interface can display whether users access a web browser, or access a particular web site, after opening a particular email advertisement, and if so, how much time elapsed between receiving/opening the email advertisement and the user's activity or change in activity. In an embodiment, the user interface can display which other advertisement messages users have opened (e.g., advertisement messages for certain goods, advertisement messages of competitors).

Similarly, with respect to an advertisement or a plurality of advertisements, the user interface can display information regarding changes to the users' personal information values that occur after the users open email advertisements. For example, after receiving (or opening) a particular advertisement email, a user may withdraw some personal information values, may add personal information values, or may block further messages from particular advertisers or particular types of advertisements. In an embodiment, with respect to a particular advertisement, the user interface can display which changes users made after receiving or opening the advertisement emails (e.g., how many users withdrew personal information values, added personal information values, blocked further messages, made no change). The user interface may also display how much time elapsed between receiving/opening the email advertisement and the change.

7 Email Interface

In an embodiment, an email account is accessed via a user interface that permits management of various aspects of email messages. For example, the user interface can have all email advertisements (or certain select email advertisements) be put in an inbox that is different than the inbox that receives other email directed to the email account. In an embodiment, the email advertisements may be addressed to the same email address as other emails directed to the email account, but the user interface nevertheless directs them to a separate inbox. In an embodiment, the email advertisements may be addressed to a different email address than another email address (e.g., for email messages that are not email advertisements) directed to the email account, but the user interface permits emails directed to both addresses to be displayed (e.g., in the same inbox or in different inboxes).

The user interface can permit the email advertisements to be sorted and displayed (e.g., in sorted order in the inbox) based on, e.g., their values received by the user, their values receivable but not yet received by the user, their ratings by the user, their ratings by all users, the personal information value that caused the email advertisement to be directed to the user. The user interface can also display, for each email in the inbox, data such as the data used in sorting the email advertisements.

In an embodiment where email advertisements are shown in the same inbox as other email messages, the email advertisements can be selectively hidden or shown as commanded by the user.

In an embodiment, the user interface of the email device (or another device such as the system server or the email system running the email account) does not permit all email addresses that are sent to the email account to be received (or if received does not permit them to be displayed to the user) by the email account. For example, in an embodiment only email messages from certain sources (e.g., an approved list of senders, such as all from within a company's email domain) are permitted, or only email messages not from certain sources (e.g., on a blocked list or spam list) are permitted.

In an embodiment, if an email message that is not permitted is sent, then the email system (or another device such as the system server) sends, to the sender of the unpermitted email, an email message that includes instructions for how to become permitted to send email messages to the user. For example, the instructions may include instructions on becoming an advertiser or otherwise paying for an email message to be sent to the user. The instructions may include a web site that the sender must use in order to register or otherwise to become authorized to send email to the user. The email message sent to the sender (or a subsequent message) may also include a code, so that the sender can resend the original (blocked) email message with the code, thereby identifying the email as previously blocked but no longer. In an embodiment, such a code (or another code) may also be used via a web site that the sender must use in order to register or otherwise to become authorized to send email to the user.

The instructions and criteria for permitting email to be sent may be defined or selected by the user. For example, the user may, via the user interface of his email device, specify an amount (e.g., $1) that such a sender must pay. Senders who are not permitted are then informed that they must pay $1 for an email to be sent to the user. The system server may then permit the sender to become an advertiser or otherwise can charge the sender $1 for sending an email message to the user, and the system server may increase the balance of the user's account by $1 (or a lower amount, e.g., if a fee is charged to the user).

In an embodiment, if an email message that is not permitted is sent, then the email system (or another device such as the system server) notifies the user of such email and/or permits the user to view the email (or portions thereof). The user may decide to permit emails from that sender to be received (e.g., one time only, a predetermined number of times, until the sender is subsequently blocked). The user may also indicate that the sender is "provisionally accepted" and the sender will continue to be sent an email message that includes instructions for how to become permitted to send email messages to the user.

What is claimed is:

1. A method performed by a computing device, the method comprising:
    receiving, by the computing device from a plurality of advertiser devices,
        a plurality of advertisements,
        for each advertisement, at least one corresponding personal information value, and
        for each advertisement, a corresponding price;
    granting, by the computing device to a message device, access to a first message account, in which the first message account has a user and has an account balance;
    calculating, by the computing device, for each of a plurality of personal information types, a corresponding price;
    instructing, by the computing device, the message device to display the plurality of personal information types and the corresponding prices;
    instructing, by the computing device, the message device to display
        an input control that permits entry of a minimum price, and
        an input control that permits entry of a respective personal information value for each of a second plurality of personal information types;
    receiving, by the computing device from the message device, a first set of personal information values of the user;
    receiving, by the computing device from the message device, a minimum price;
    determining, by the computing device, a first subset of the advertisements that match the first set of personal information values, without making the first set of personal information values available to any of the plurality of advertiser devices,
    in which
        each advertisement of the first subset matches at least one of the first set of personal information values, and
        each advertisement of the first subset has a corresponding price which is not less than the minimum price;
    sending, by the computing device to the first message account, a plurality of messages, in which each message includes a respective advertisement of the subset of advertisements;
    determining, by the computing device, an amount to pay the user based on the prices corresponding to the subset of advertisements;
    increasing, by the computing device, the account balance by the amount to pay the user;
    instructing, by the computing device, the message device to display a list of personal information values that have been made available to the computing device;
    after sending the plurality of messages, receiving, by the computing device, a command to withdraw at least one personal information value of the first set of personal information values;
    rendering the at least one personal information value inaccessible to the computing device;
    determining, by the computing device, a second subset of the advertisements that match a second set of personal information values,
        in which the second set of personal information values includes
            each of the first set of personal information values except for
                the at least one personal information value, whereby the second set of personal information values does not include the at least one personal information value for which the command to withdraw was received; and
    sending, by the computing device to the first message account, a plurality of messages, in which each message includes an advertisement of the second subset of advertisements.

2. A method performed by a computing device, the method comprising:
  receiving, by the computing device from a plurality of advertiser devices,
    a plurality of advertisements,
    for each advertisement, at least one corresponding personal information value, and
    for each advertisement, a corresponding price;
  granting, by the computing device to a message device, access to a first message account, in which the first message account has a user;
  calculating, by the computing device, for each of a plurality of personal information types, a corresponding price;
  instructing, by the computing device, the message device to display the plurality of personal information types and the corresponding prices;
  receiving, by the computing device from the message device, a first set of personal information values of the user;
  determining, by the computing device, a first subset of the advertisements that match the first set of personal information values, without making the first set of personal information values available to any of the plurality of advertiser devices,
    in which
      each advertisement of the first subset matches at least one of the first set of personal information values, and
  sending, by the computing device to the first message account, a plurality of messages, in which each message includes a respective advertisement of the subset of advertisements;
  instructing, by the computing device, the message device to display a list of personal information values that have been made available to the computing device;
  after sending the plurality of messages, receiving, by the computing device, a command to withdraw at least one personal information value of the first set of personal information values;
  rendering the at least one personal information value inaccessible to the computing device;
  determining, by the computing device, a second subset of the advertisements that match a second set of personal information values,
    in which the second set of personal information values includes
      each of the first set of personal information values except for
        the at least one personal information value, whereby the second set of personal information values does not include the at least one personal information value for which the command to withdraw was received; and
  sending, by the computing device to the first message account, a plurality of messages, in which each message includes an advertisement of the second subset of advertisements.

3. The method of claim 2, in which rendering the at least one personal information value inaccessible to the computing device comprises:
  preventing the computing device from interpreting the at least one personal information value.

4. The method of claim 2, in which rendering the at least one personal information value inaccessible to the computing device comprises:
  removing the at least one personal information value from a database of the computing device.

5. The method of claim 2, in which the step of receiving from a plurality of advertiser devices comprises:
  receiving, for each advertisement, a corresponding price to pay for sending the advertisement to the desired destination and a corresponding price to pay for opening the advertisement.

6. The method of claim 2, in which calculating, for each of a plurality of personal information types, a corresponding price comprises:
  for each of the plurality of personal information types,
    determining a second subset of advertisements, in which each advertisement of the second subset has a corresponding personal information value that matches the personal information type,
    for each of the second subset of advertisements, determining the respective price corresponding to the advertisement; and
    calculating the corresponding price of the personal information type based on the respective prices of the second subset of advertisements.

7. The method of claim 2, in which calculating the corresponding price of the personal information type based on the respective prices of the second subset of advertisements comprises:
  calculating the corresponding price of the personal information type based on a predetermined number of the greatest prices of the respective prices of the second subset of advertisements.

8. The method of claim 2, in which calculating, for each of a plurality of personal information types, a corresponding price comprises:
  for each of the plurality of personal information types,
    determining the personal information value of the user that corresponds to the personal information type,
    determining a second subset of advertisements, in which each advertisement of the second subset has a corresponding personal information value that matches the personal information value of the user,
    for each of the second subset of advertisements, determining the respective price corresponding to the advertisement; and
    calculating the corresponding price of the personal information type based on the respective prices of the second subset of advertisements.

9. The method of claim 8, in which calculating the corresponding price of the personal information type based on the respective prices of the second subset of advertisements comprises:
  calculating the corresponding price of the personal information type based on a predetermined number of the greatest prices of the respective prices of the second subset of advertisements.

10. The method of claim 2, further comprising:
  receiving, from the message device, a second set of personal information values of the user,
    in which the second set of personal information values includes
      the first set of personal information values, and
      at least one personal information value that is not included in the first set of personal information values; and
  receiving, from the message device, a release request for each of the first set of personal information values but not for the at least one personal information value that is not included in the first set of personal information values.

11. The method of claim 2, in which receiving, from the message device, a first set of personal information values of the user comprises:
receiving, from the message device, a first set of message activity values of the user;
and in which
determining a first subset of the advertisements that match the first set of personal information values comprises:
determining a first subset of the advertisements that match the first set of message activity values.

12. The method of claim 2, in which the message device comprises a smart phone.

13. The method of claim 2, further comprising
instructing at least one advertiser device of the plurality of advertiser devices to display:
an input control that permits entry of
a first advertisement,
at least one corresponding personal information value for the first advertisement, and
a corresponding price for the first advertisement; and
an input control that permits transmission, by the at least one advertiser device, of a command to send; and
receiving, from the at least one advertiser device, the command to send.

14. The method of claim 13, in which the step of receiving from the plurality of advertiser devices comprises:
receiving, from the at least one advertiser device,
the first advertisement,
the at least one corresponding personal information value for the first advertisement, and
the corresponding price for the first advertisement.

15. The method of claim 13, further comprising:
determining a second subset of the advertisements that match a second set of personal information values;
determining the corresponding prices of the second subset of the advertisements;
determining the highest price of the corresponding prices of the second subset of the advertisements; and
instructing the at least one advertiser device to display:
the second set of personal information values, and
for each of the second set of personal information values, a highest price for the second set of personal information values.

16. The method of claim 2, further comprising
instructing the message device to display:
an input control that permits entry of
a minimum price; and
in which determining a first subset of the advertisements comprises:
determining a first subset of the advertisements, in which
each advertisement of the first subset matches at least one of the first set of personal information values, and
each advertisement of the first subset has a corresponding price which is not less than the minimum price.

17. The method of claim 2, further comprising
instructing the message device to output an indication of, for each of a plurality of types of personal information, whether a corresponding personal information value has been released.

18. The method of claim 2, further comprising:
receiving a command to withdraw at least one personal information value of the first set of personal information values;
determining a second subset of the advertisements that match a second set of personal information values,
in which the second set of personal information values includes
each of the first set of personal information values except for
the at least one personal information value, whereby the second set of personal information values does not include the at least one personal information value; and
sending, to the first message account, a plurality of messages, in which each message includes an advertisement of the second subset of advertisements.

19. The method of claim 2, further comprising
receiving, from the message device, a first set of personal information values of the user;
receiving, from a data source other than the message device, a second set of personal information values of the user;
determining a first subset of the advertisements that match a third set of personal information values without making the third set of personal information values available to any of the plurality of advertiser devices;
in which the third set of personal information values of the user includes
the first set of personal information values of the user, and
the second set of personal information values of the user.

20. A method performed by a server of a web site, the method comprising:
receiving, by the server of the web site from a plurality of advertiser devices,
a plurality of advertisements,
for each advertisement, at least one corresponding personal information value, and
for each advertisement, a corresponding price;
granting, by the server of the web site to a message device, access to a first message account, in which the first message account has a user;
calculating, by the server of the web site, for each of a plurality of personal information types, a corresponding price;
instructing, by the server of the web site, the message device to display the plurality of personal information types and the corresponding prices;
receiving, by the server of the web site from the message device, a first set of personal information values of the user;
determining, by the server of the web site, a first subset of the advertisements that match the first set of personal information values, without making the first set of personal information values available to any of the plurality of advertiser devices,
in which
each advertisement of the first subset matches at least one of the first set of personal information values, and
sending, by the server of the web site to the first message account, a plurality of messages, in which each message includes a respective advertisement of the subset of advertisements;
instructing, by the server of the web site, the message device to output an indication of, for each of a plurality of types of personal information, whether a corresponding personal information value has been released;

after sending the plurality of messages, receiving, by the server of the web site, a command to withdraw at least one personal information value of the first set of personal information values;

rendering the at least one personal information value inaccessible to the server of the web site;

determining, by the server of the web site, a second subset of the advertisements that match a second set of personal information values,
 in which the second set of personal information values includes
  each of the first set of personal information values
 except for
  the at least one personal information value, whereby the second set of personal information values does not include the at least one personal information value for which the command to withdraw was received; and sending, by the server of the web site to the first message account, a plurality of messages, in which each message includes an advertisement of the second subset of advertisements.

\* \* \* \* \*